(12) United States Patent
Fujita

(10) Patent No.: US 10,085,290 B2
(45) Date of Patent: Sep. 25, 2018

(54) DISCOVERING WIRELESS COMMUNICATION DEVICE BASED ON REQUIRED SERVICES

(71) Applicant: SONY CORPORATION, Tokyo (JP)

(72) Inventor: Chihiro Fujita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 66 days.

(21) Appl. No.: 14/890,675

(22) PCT Filed: May 14, 2014

(86) PCT No.: PCT/JP2014/062883
§ 371 (c)(1),
(2) Date: Nov. 12, 2015

(87) PCT Pub. No.: WO2014/203657
PCT Pub. Date: Dec. 24, 2014

(65) Prior Publication Data
US 2016/0135233 A1    May 12, 2016

(30) Foreign Application Priority Data
Jun. 19, 2013    (JP) ................................ 2013-128614

(51) Int. Cl.
*H04W 76/02* (2009.01)
*H04L 12/28* (2006.01)
(Continued)

(52) U.S. Cl.
CPC ............ *H04W 76/02* (2013.01); *G08C 17/00* (2013.01); *H04L 12/282* (2013.01);
(Continued)

(58) Field of Classification Search
CPC ..... H04W 64/00; H04W 88/06; H04W 12/06; H04W 4/008; H04L 63/0492
See application file for complete search history.

(56) References Cited

U.S. PATENT DOCUMENTS

2006/0085579 A1 *  4/2006  Sato ........................ G08C 17/02
                                                        710/73
2006/0251059 A1 * 11/2006  Otsu ...................... H04L 12/282
                                                        370/352
(Continued)

FOREIGN PATENT DOCUMENTS

CN            1776765 A        5/2006
CN          102685922 A        9/2012
(Continued)

OTHER PUBLICATIONS

Extended European Search Report of EP Patent Application No. 14814278.9, dated Jan. 27, 2017, 12 pages.
(Continued)

*Primary Examiner* — Jung Park
(74) *Attorney, Agent, or Firm* — Chip Law Group

(57) ABSTRACT

Provided is a wireless communication device including: a first wireless interface configured to send a first wireless signal having directivity; a second wireless interface; and a controller configured to allow the second wireless interface to establish a connection with a first device when a second wireless signal received by the second wireless interface includes an indicator indicating that the first wireless signal is received by the first device being a sending source device of the second wireless signal.

18 Claims, 17 Drawing Sheets

(51) Int. Cl.
*H04Q 9/00* (2006.01)
*H04W 4/00* (2018.01)
*G08C 17/00* (2006.01)
*H04M 1/725* (2006.01)
*H04W 72/04* (2009.01)
*H04W 76/10* (2018.01)
*H04W 88/06* (2009.01)
*H04N 21/41* (2011.01)
*H04N 21/436* (2011.01)

(52) U.S. Cl.
CPC ...... *H04L 12/2803* (2013.01); *H04L 12/2809* (2013.01); *H04M 1/7253* (2013.01); *H04Q 9/00* (2013.01); *H04W 4/00* (2013.01); *H04W 72/048* (2013.01); *H04W 76/10* (2018.02); *H04M 2250/12* (2013.01); *H04N 21/4122* (2013.01); *H04N 21/43615* (2013.01); *H04W 88/06* (2013.01)

(56) References Cited

U.S. PATENT DOCUMENTS

| | | | |
|---|---|---|---|
| 2011/0252443 A1 | 10/2011 | Tiddens | |
| 2012/0025957 A1* | 2/2012 | Yang | H05B 37/0272 340/12.5 |
| 2012/0191780 A1* | 7/2012 | Sato | H04W 8/005 709/204 |
| 2012/0230308 A1* | 9/2012 | Saito | H04W 48/16 370/338 |
| 2015/0082355 A1* | 3/2015 | Tiddens | H04N 21/43637 725/48 |
| 2015/0334638 A1* | 11/2015 | Kim | H04W 48/14 370/329 |

FOREIGN PATENT DOCUMENTS

| | | |
|---|---|---|
| EP | 1647958 A1 | 4/2006 |
| JP | 2005-159821 A | 6/2005 |
| JP | 2006-115196 A | 4/2006 |
| JP | 2006-165831 A | 6/2006 |
| JP | 2007-189348 A | 7/2007 |
| JP | 2012-049625 A | 3/2012 |
| JP | 2013-115828 A | 6/2013 |

OTHER PUBLICATIONS

Partial European Search Report for EP Patent Application No. 14814278.9 dated Oct. 24, 2016, 7 pages.

Office Action for JP Patent Application No. 2015-522666, dated May 15, 2018, 6 pages of Office Action and 4 pages of English Translation.

Office Action for CN Patent Application No. 201480033351.0, dated Jul. 2, 2018, 10 pages of Office Action and 13 pages of English Translation.

* cited by examiner

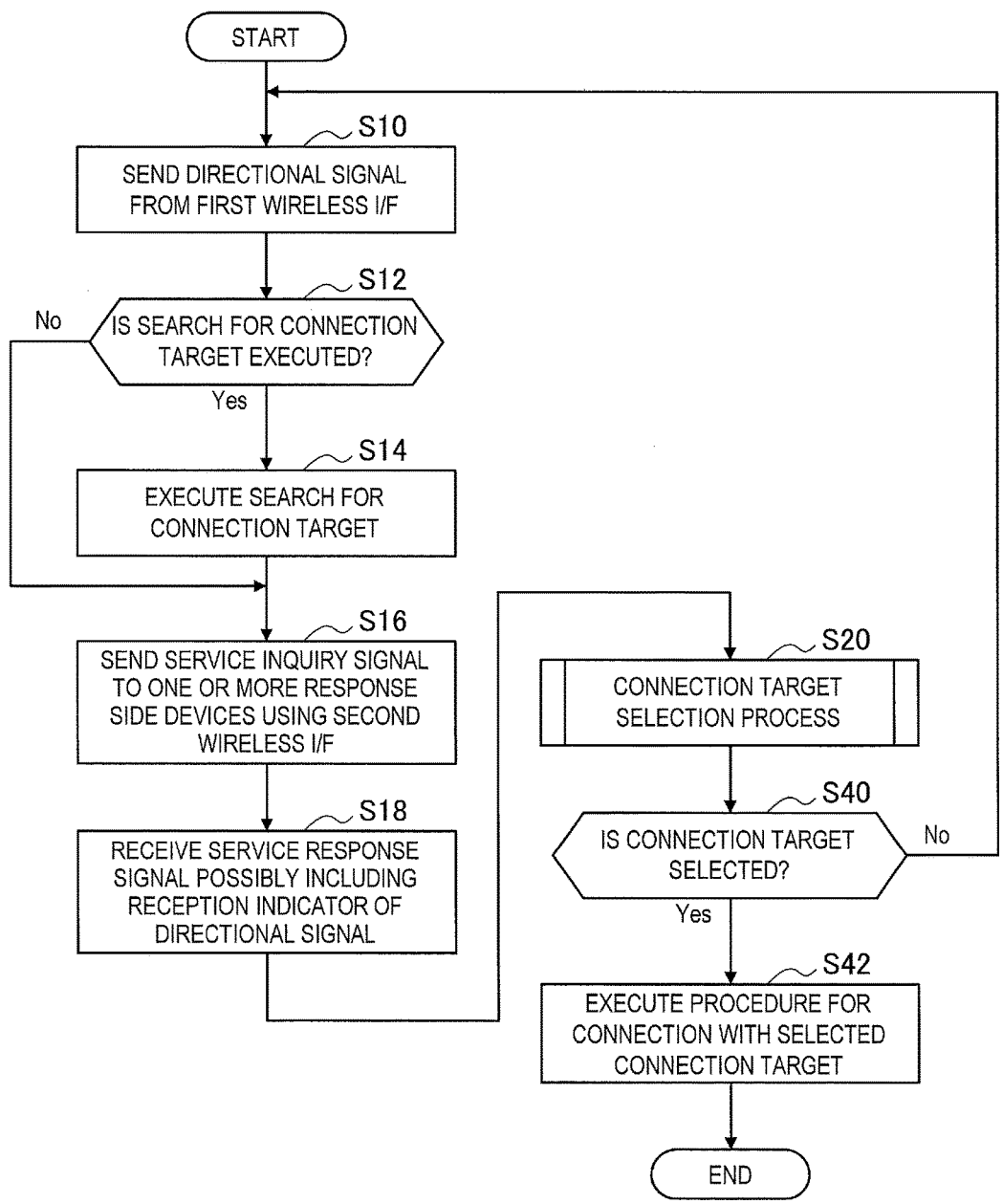

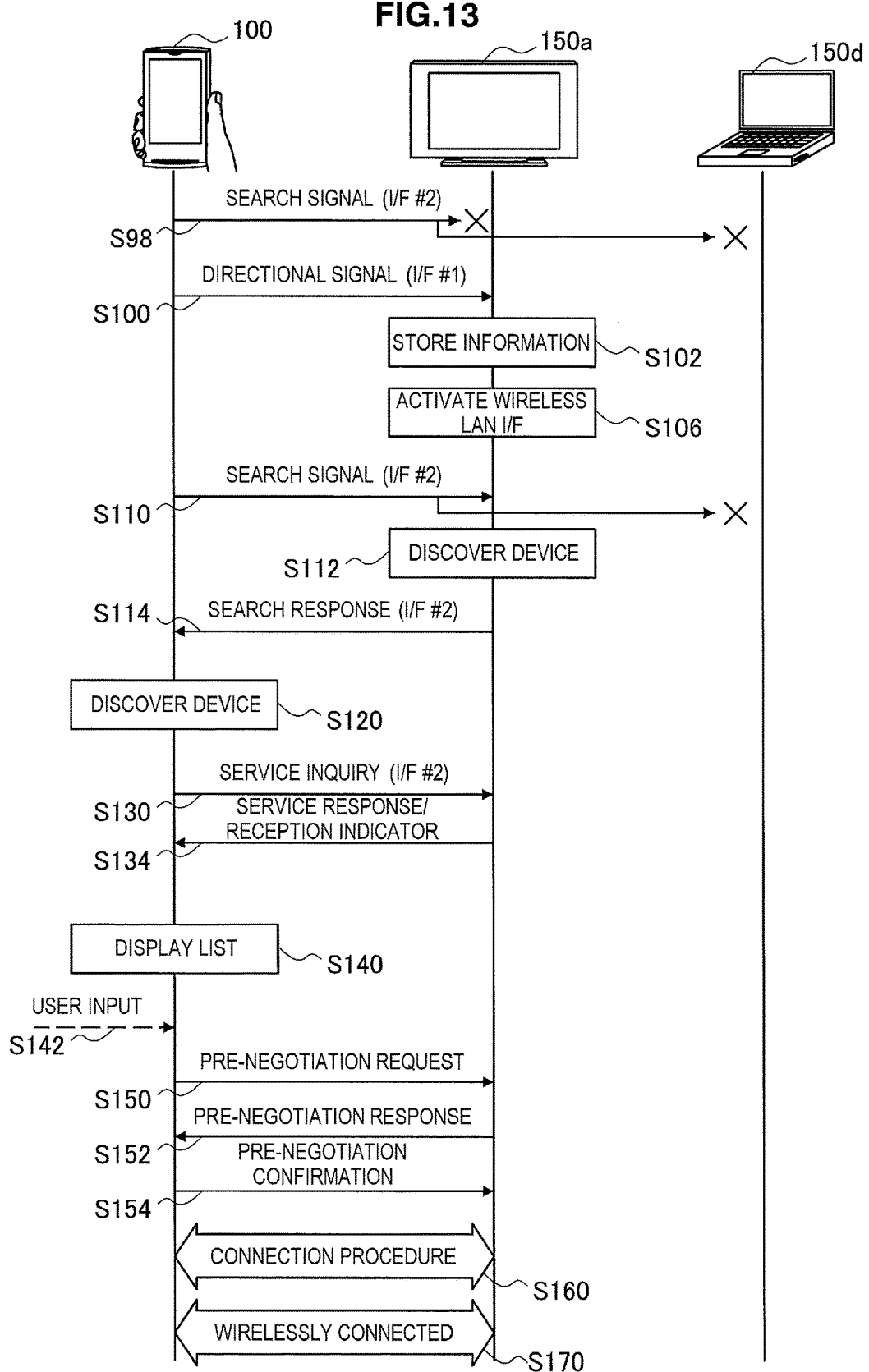

DISCOVERING WIRELESS COMMUNICATION DEVICE BASED ON REQUIRED SERVICES

TECHNICAL FIELD

The present invention relates to a wireless communication device and a communication control device.

BACKGROUND ART

In related art, a wireless connection method that interconnects wireless communication devices with each other in peer-to-peer mode has been used. One example of such wireless connection method is ad-hoc mode or Wi-Fi Direct of wireless local area network (LAN) standardized under the IEEE 802.11 series. The Miracast (registered trademark) that is display-mirroring technology created by the Wi-Fi Alliance allows a display video to be transmitted from one terminal to another serving as a connection target, and to be displayed on a screen of the other terminal using a wireless connection established over Wi-Fi Direct.

When a plurality of candidates for a connection target exist near a wireless communication device, the capability to specify a candidate that is necessary to establish a wireless connection with the wireless communication device in an accurate and easy way is advantageous to the user. In this respect, Patent Literature 1 discloses a technique that allows the user to specify a connection target using a so-called "touch" in close proximity wireless communication technology such as near-field communication (NFC). Patent Literature 2 discloses a technique that determines a "touch" based on the received signal strength of wireless signals.

CITATION LIST

Patent Literature

Patent Literature 1: JP 2008-283590A
Patent Literature 2: JP 2012-199905A

SUMMARY OF INVENTION

Technical Problem

However, when a user who is setting on a living room chair attempts to establish a wireless connection between a portable terminal held with the hand and a television set that is located away from the portable terminal, it will be inconvenient for the user to stand up from the chair and go to the television set to touch it.

Therefore, it is desirable to provide a mechanism for allowing the user to select easily a target to be connected wirelessly without causing the user to perform an operation that imposes a burden on the user.

Solution to Problem

According to the present disclosure, there is provided a wireless communication device including: a first wireless interface configured to send a first wireless signal having directivity; a second wireless interface; and a controller configured to allow the second wireless interface to establish a connection with a first device when a second wireless signal received by the second wireless interface includes an indicator indicating that the first wireless signal is received by the first device being a sending source device of the second wireless signal.

According to the present disclosure, there is provided a communication control device including: a processor configured to execute a program allowing a second wireless interface to establish a connection with a first device, when a first wireless signal having directivity is sent via a first wireless interface and a second wireless signal received via the second wireless interface includes an indicator indicating that the first wireless signal is received by the first device being a sending source device of the second wireless signal; and a memory configured to store the program.

According to the present disclosure, there is provided a wireless communication device including: a first wireless interface capable of receiving a first wireless signal having directivity; a second wireless interface; and a controller configured to allow a second wireless signal to be sent from the second wireless interface to a first device when the first wireless signal is received by the first wireless interface, the second wireless signal including an indicator indicating that the first wireless signal is received, the first device being configured to search for a connection target in a wireless communication mode supported by the second wireless interface.

According to the present disclosure, there is provided a communication control device including: a processor configured to execute, when a first wireless signal having directivity is received via a first wireless interface, a program allowing a second wireless signal to be sent to a first device via a second wireless interface, the second wireless signal including an indicator indicating that the first wireless signal is received, the first device being configured to search for a connection target in a wireless communication mode supported by the second wireless interface; and a memory configured to store the program.

Advantageous Effects of Invention

In embodiments of the technology according to the present disclosure, there is provided a mechanism for allowing the user to select easily a target to be connected wirelessly without causing the user to perform an operation that imposes a burden on the user.

BRIEF DESCRIPTION OF DRAWINGS

FIG. 3 is a flowchart illustrating an exemplary processing procedure performed by the wireless communication device on the request side according to one embodiment.

FIG. 13 is a sequence diagram illustrating a third example of a control procedure in the communication control system according to one embodiment.

DESCRIPTION OF EMBODIMENTS

Hereinafter, (a) preferred embodiment(s) of the present disclosure will be described in detail with reference to the appended drawings. Note that, in this specification and the drawings, elements that have substantially the same function and structure are denoted with the same reference signs, and repeated explanation is omitted.

The description will be given in the following order.
1. Overview of System
2. Exemplary Configuration of Request Side
2-1. Device Configuration
2-2. Processing Procedure
3. Exemplary Configuration of Response Side
3-1. Device Configuration
3-2. Processing Procedure
4. Exemplary User Interface
5. Exemplary Signal Format
6. Processing Sequence
7. Conclusion

1. OVERVIEW OF SYSTEM

Figure 1:
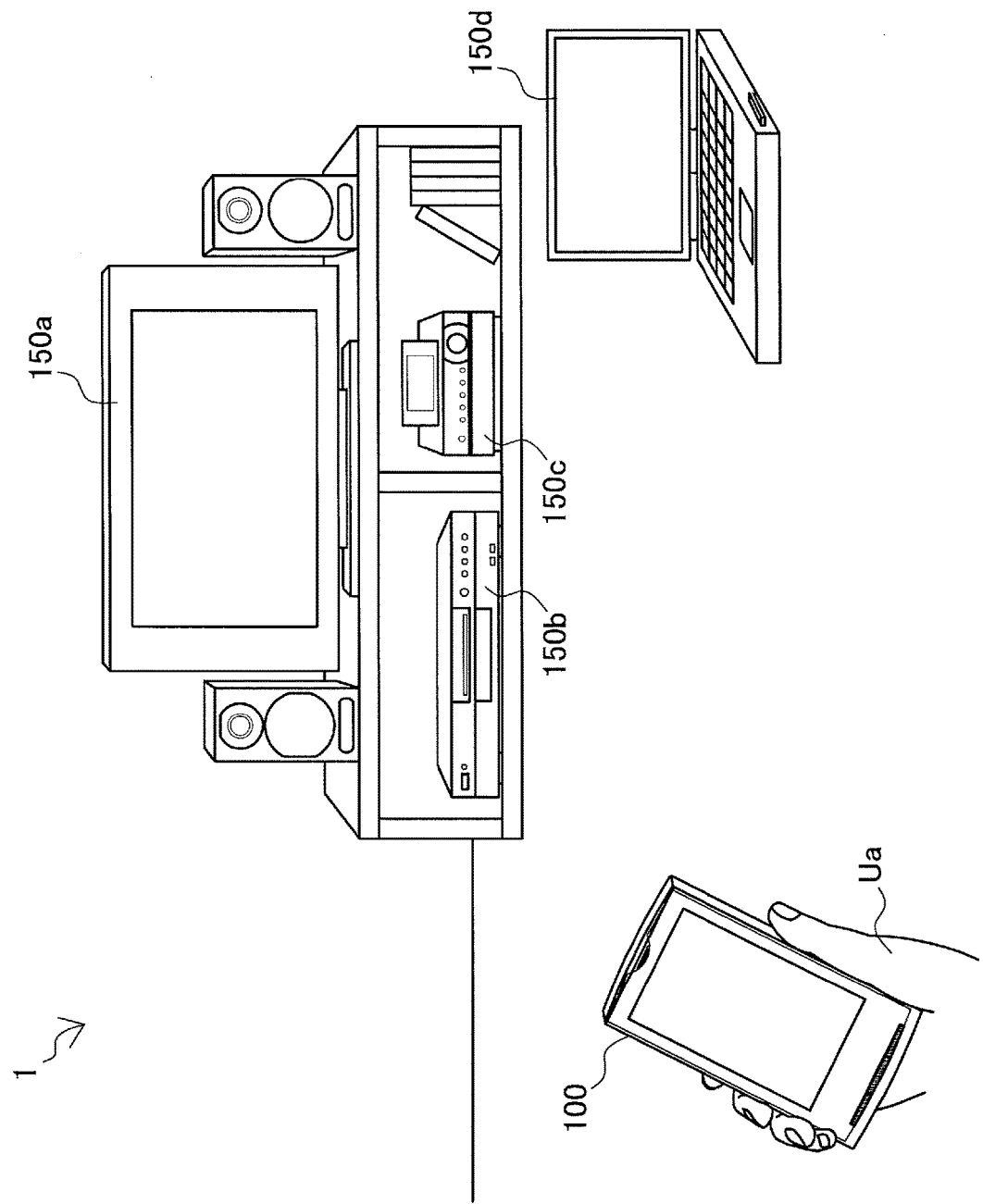
FIG. 1 is a diagram illustrated to describe an overview of a communication control system according to one embodiment.

An overview of a system to which the technology according to the present disclosure is applied will be described. FIG. 1 is a diagram illustrated to describe an overview of a communication control system 1 according to one embodiment. Referring to FIG. 1, the communication control system 1 includes a wireless communication device 100 and wireless communication devices 150a, 150b, 150c, and 150d.

The wireless communication device 100 is a terminal device operated by a user Ua. The wireless communication device 100 has a wireless interface capable of performing wireless communication with other devices in peer-to-peer mode. As one example, the wireless interface may be a wireless LAN interface. In the example shown in FIG. 1, the wireless communication device 100 is a smartphone. However, the wireless communication device 100 is not limited to such example. An example of the wireless communication device 100 may include tablet personal computers (PCs), portable game consoles, personal digital assistants (PDAs), and any type of terminal devices such as portable content players.

The wireless communication devices 150a, 150b, 150c, and 150d are electronic equipment connectable to the wireless communication device 100. In the example shown in FIG. 1, the wireless communication device 150a is a television set. The wireless communication device 150b is a video recording/playback device. The wireless communication device 150c is a printer. The wireless communication device 150d is a notebook PC. The wireless communication devices 150a, 150b, 150c, and 150d have a wireless interface (e.g., wireless LAN interface) that supports a wireless communication mode common to the wireless communication device 100. In the following description, when the wireless communication devices 150a, 150b, 150c, and 150d are not necessary to distinguish from each other, they are collectively referred to as a wireless communication device 150 by omitting an alphabet at the end of reference signs. The wireless communication device 150 may be any type of electronic equipment.

In the communication control system 1, it is assumed for the user Ua to wish to transmit a display video of the wireless communication device 100 to the wireless communication device 150a, for example, using the Miracast (registered trademark). In the existing technique, the user Ua will select the wireless communication device 150a from a list of candidates displayed on a screen to specify a target to be connected to the wireless communication device 100 among the plurality of candidates. However, in many cases, it is difficult for the user to find out which device is indicated by information such as a device name or model number that can be shown in the candidate list. Meanwhile, the technique disclosed in Patent Literature 1 or 2 mentioned above, the user Ua can specify the wireless communication device 150 as a target to be connected to the wireless communication device 100 by allowing the wireless communication device 100 to be touched with the wireless communication device 150a. However, the user Ua who is located at a distance from the wireless communication device 150a probably does not want to move just because of performing the touch operation. The same challenge will be presented in specifying a connection target, for example, when the content included in the wireless communication device 100 is caused to be reproduced by the wireless communication device 150b through a wireless connection, when data included in the wireless communication device 100 is caused to be printed by the wireless communication device 150c through a wireless connection, and when data is caused to be exchanged between the wireless communication device 100 and the wireless communication device 150d through a wireless connection. Therefore, it is desirable to provide a mechanism for allowing the user to select easily a target to be connected wirelessly without causing the user to perform an operation that imposes a burden on the user.

To achieve the above-mentioned mechanism, in one embodiment, there is provided a wireless interface that sends a wireless signal having directivity to the wireless communication device 100. An example of the wireless interface for directional signals may include an infrared interface such as an infrared data association (IrDA) interface. Alternatively, the wireless interface for directional signals may be a visible light interface (a laser pointer may be included therein) or a millimeter-wave air interface.

Meanwhile, the corresponding wireless interface for receiving directional signals is provided in the wireless communication device 150. The user Ua directs an infrared interface of the wireless communication device 100 toward a desired connection target to allow the wireless communication device 100 to send directional signals. The wireless communication device 150, when receiving a directional signal from the wireless communication device 100, sends a reception indicator indicating that the directional signal is received back to the wireless communication device 100. This allows the wireless communication device 100 to specify a connection target at which the user Ua points by using the wireless communication device 100. Then, a wireless connection may be established between the wireless communication device 100 and the specified connection target. Such a mechanism allows the user to achieve a wireless connection with a desired connection target, without being moved to a place where a desired connection target is present just because of performing the touch operation, or without being in trouble with a device name that is difficult to know.

A device that requests the establishment of a wireless connection, such as the wireless communication device 100 shown in FIG. 1, will be herein referred to as a request side device. A device that receives a request to establish a wireless connection, such as the wireless communication devices 150a, 150b, 150c, and 150d (the wireless communication device 150) shown in FIG. 1, will be herein referred to as a response side device or a connection target. In the next description section, a detailed exemplary configuration of the request side device will be described. In the further next description section, a detailed exemplary configuration of the response side device will be described.

2. EXEMPLARY CONFIGURATION OF REQUEST SIDE

2-1. Device Configuration

Figure 2:
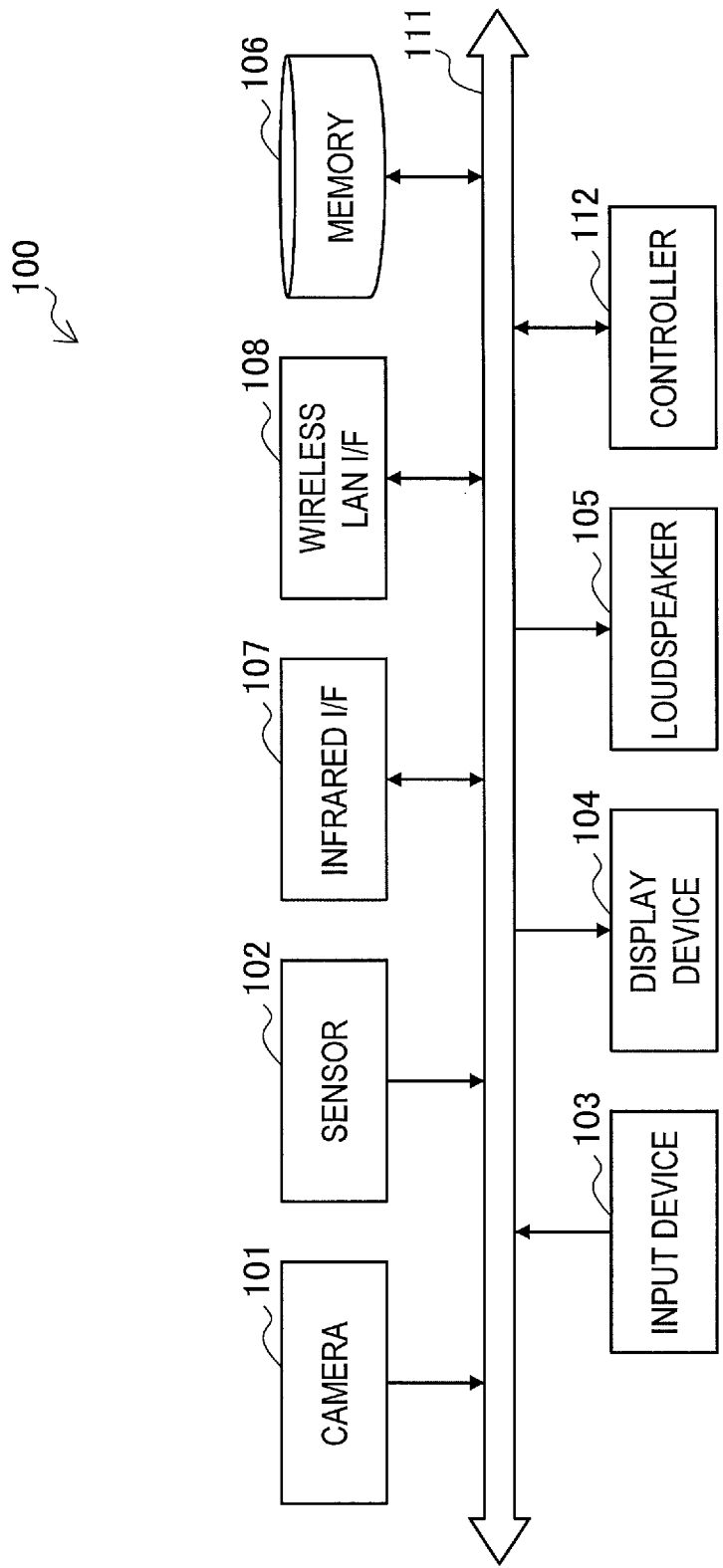
FIG. 2 is a block diagram illustrating an exemplary configuration of a wireless communication device on the request side according to one embodiment.

FIG. 2 is a block diagram illustrating an exemplary configuration of the wireless communication device 100. Referring to FIG. 2, the wireless communication device 100 is configured to include a camera 101, a sensor 102, an input device 103, a display device 104, a loudspeaker 105, a memory 106, an infrared interface 107, a wireless LAN interface 108, a bus 111, and a controller 112.

The camera includes an image sensor such as charge-coupled device (CCD) or complementary-metal-oxide semiconductor (CMOS) and generates a captured image. The sensor 102 may be at least one among a sensor group including a positioning sensor, a gyro sensor, a geomagnetic sensor, and an acceleration sensor. An example of the input device 103 includes a touch sensor, a keypad, a keyboard, a button, and a switch. The input device 103 receives the user's operation or information input. The touch sensor detects a contact on a screen of the display device 104. The display device 104 includes a screen of a liquid display device (LCD), an organic light-emitting diode (OLED) display, or the like. The loudspeaker 105 converts audio signals outputted from the wireless communication device 100 to sound. The memory 106 includes random-access memory (RAM) and read-only memory (ROM). Data and a program executed by the controller 112 described later are stored in the memory 106.

The infrared interface 107 is a first wireless interface configured to send a directional signal that is a wireless signal (infrared signal) having directivity. The infrared interface 107 sends a directional signal in response to the user's instruction under the control of the controller 112 described later. As an example, when the user intends to establish a wireless LAN connection between the wireless communication device 100 and other devices, the infrared interface 107 sends a directional signal having a predetermined format.

The infrared interface 107 is provided with a light-emitting portion arranged thereon to allow the user to easily discriminate the optical axis direction of the directional signal being sent (e.g., to allow the optical axis direction to be perpendicular to a surface of a housing). The user instructs the infrared interface 107 to send a directional signal while directing the light-emitting portion toward the direction where a connection target for wireless LAN connection is present. Then, the directional signal sent from the infrared interface 107 reaches a connection target at which the user is pointing. The directional signal does not reach a device outside the range of the signal directivity.

The directional signal described above that is sent at the time of connection attempt of a wireless LAN connection contains information used to identify the wireless communication device 100. The identification information is used for the response side device receiving the directional signal to determine that the request side device requesting a wireless LAN connection is the wireless communication device 100. The identification information may be a media access control (MAC) address or may be any other identifiers. The directional signal may contain protocol information that indicates a protocol of the service being requested. The protocol information may be a flag, or may be a protocol name or code. The format of a directional signal to describe management information that can include these identification information and protocol information may be defined in advance.

The wireless LAN interface 108 is a second wireless interface that operates in accordance with a wireless LAN mode. The wireless LAN interface 108 may establish a peer-to-peer wireless connection with the response side device according to the connection procedure using Wi-Fi Direct or in ad-hoc mode. The wireless connection established by the wireless LAN interface 108 may be used to transmit any type of data including display video data, content data, print data, and application data.

The wireless LAN interface 108, when establishing a wireless connection with the response side device, sends a service inquiry signal. The service inquiry signal is a signal used to obtain a reply of service information about the service supported by the response side device. The wireless LAN interface 108 may send a search signal used to search for a connection target to which a service inquiry signal is to be sent prior to the service inquiry. Alternatively, it may send a single signal serving as both the service inquiry signal and search signal. As an example, when a wireless connection using Wi-Fi Direct is used, the service inquiry signal may be a service discovery request (query) in the service discovery procedure using Wi-Fi Direct. The search signal may be a probe request in the device discovery procedure using Wi-Fi Direct.

The response side device, when receiving the service inquiry signal sent from the wireless communication device 100, replies a service response signal. In replying the service response signal, the response side device inserts a reception indicator used to indicate the reception of the inquiry signal into the service response signal when the time elapsed from the reception of the inquiry signal sent from the wireless communication device 100 falls below a threshold. The wireless LAN interface 108 receives the service response signal that is likely to contain such a reception indicator. As an example, when a wireless connection using Wi-Fi Direct is used, the service response signal may be a service discovery response in the device discovery procedure using Wi-Fi Direct. An example of a format for the service discovery request and the service discovery response will be described later.

The bus 111 connects the camera 110, the sensor 102, the input device 103, the display device 104, the loudspeaker 105, the memory, the infrared interface 107, the wireless LAN interface 108, and the controller 112 with each other.

The controller 112 may be a central processing unit (CPU) or a system on chip (SoC). The controller 112 controls the entire function of the wireless communication device 100. For example, when the controller 12 receives the user's instruction to start to establish the wireless LAN connection between the wireless LAN interface 108 and other device, the controller 12 reads the above-mentioned management information from the memory 106 and may allow the directional signal that can contain the read management information to be sent from the infrared interface 107. The controller 112 may allow the directional signal periodically to be set from the infrared interface 107 until a connection target is determined, until the establishment of a wireless LAN connection is completed, or until the cancellation is instructed by the user.

The controller 112 instructs the wireless LAN interface 108 to search for a connection target or to submit a service inquiry. The search for a connection target is a procedure to detect a device connectable with the wireless LAN interface 108. Meanwhile, the service inquiry is a procedure to collect service information from the detected connection target (a candidate thereof). The search for a connection target and the service inquiry may be started with the transmission of the directional signal as a trigger or may be executed periodically regardless of the transmission of the directional signal. The controller 112, when receiving the service response signal by the wireless LAN interface 108, determines whether the service response signal contains the above-mentioned reception indicator. The reception indicator indicates that the directional signal is received by the response side device acting as a sending source device of the service response signal within the most recent predetermined period. When the service response signal contains the above-mentioned reception indicator, the controller 112 determines that the user specifies a sending source device of the service response signal as a connection target to be connected with the wireless LAN interface 108.

As an example, the controller 112 may determine that the user specifies the response side device as a connection target when a plurality of service response signals contain continuously the above-mentioned reception indicator received from the same response side device over the number of times or period that exceeds a first threshold. This configuration makes it possible, even when the user temporarily points at a device that is not a target to be connected (due to erroneous operation or the like), to reduce the likelihood of determining that the device is a connection target against the user's intention.

The controller 112 determines a connection target according to the reception indicator contained in the service response signal and then may ask for the user's approval to establish a wireless connection between the wireless LAN interface 108 and the connection target. For example, the controller 112 may allow a list of devices connectable with the wireless LAN interface to be displayed on a screen of the display device 104, and may allow the connection target that is determined according to the reception indicator to be displayed in the list in a highlighted manner. This configuration makes it possible, before the user establishes a wireless connection, to check whether a connection target is properly recognized. It is possible for the user to point at a different device by moving the wireless communication device 100 and to view a change in the highlights, thereby intuitively recognizing which item in the list corresponds to which device in the real space. An example of such user interface will be further described later.

When the user approves the connection with the connection target determined according to the reception indicator, the controller 112 allows the wireless LAN interface 108 to establish a connection with the connection target. When the approval of a connection with a device that is not a target to be connected is obtained, the user may reject the connection or may specify explicitly another device as a connection target.

The controller 112 determines a connection target according to the reception indicator contained in the service response signal and then may allow the wireless LAN interface 108 to establish the connection with the connection target automatically without waiting for the user's approval. In this case, it is possible to reduce the time taken to establish a wireless connection and to minimize the burden on the user. When a plurality of service response signals received from the same connection target over the number of times or period that exceeds a second threshold contain continuously the above-mentioned reception indicator, the controller 112 may allow the wireless LAN interface 108 to establish the connection with the connection target automatically. The second threshold may be a value greater than the above-mentioned first threshold (e.g., several seconds). This makes it possible to implement a special user interface that continues to point at the same equipment over a period in the infrared interface 107 to select a connection target.

The controller 112 may display information indicating that the wireless LAN interface 108 is being processed on a screen before the wireless LAN interface 108 establishes a wireless connection, even after the infrared interface 107 sends a directional signal. In general, in some cases, it may take a few seconds to search for a connection target and to submit a service inquiry. Thus, the status of processing can be fed back to the user during the waiting time, thereby further improving the usability. The processing status may be fed back to the user with the use of the lighting or blinking of a lamp, vibration of a vibrator, and audio output from the loudspeaker, in addition to a display on a screen.

In this section, the infrared interface and the wireless LAN interface are exemplified as the first wireless interface and the second wireless interface, respectively. However, a combination of wireless interfaces is not limited to the above example. For example, a wireless interface for sending a visible light signal or a millimeter-wave signal in place of the infrared signal may be used as the first wireless interface for sending a directional signal. The ultra-wideband communication interface such as wireless USB may be used as the second wireless interface.

2-2. Processing Procedure (1) General Procedure

FIG. 3 is a flowchart illustrating an example of the processing procedure performed by the wireless communication device 100 according to the present embodiment. The process illustrated in FIG. 3 may be started, for example, when the user's instruction to establish a wireless LAN connection with other device is detected.

The controller 112 instructs the infrared interface 107 (the first wireless I/F) to send a directional signal that may contain identification information of the wireless communication device 100 and protocol information of the wireless LAN interface 108 (step S10).

The controller 112 determines whether to execute a search for a connection target (step S12). The controller 112, when it is determined that a search for a connection target is executed, searches (e.g., the device discovery procedure using Wi-Fi Direct) for a connection target (step S14). This allows one or more of the response side devices to be detected. Meanwhile, when the search for a connection target is completed before the directional signal is sent, the controller 112 may skip the process of searching for a connection target.

The controller 112 executes a service inquiry (e.g., the service discovery procedure using Wi-Fi Direct). More specifically, the controller 112 instructs the wireless LAN interface 108 (the second wireless I/F) to send a service inquiry signal to each of the response side devices that are detected in the process of searching for a connection target (step S16). A service response signal as a response to the service inquiry signal is received from each of the response side devices (step S18). Any of the service response signals being received may contain a reception indicator of a directional signal.

The controller 112 executes a connection target selection process (step S20). Some examples of the detailed procedure of the connection target selection process will be described later. If a connection target is not selected from the connection target selection process, the process returns to step S10 and the above-mentioned process may be repeated (step S40). If a connection target to be connected with the wireless LAN interface 108 is selected from the connection target selection process, the controller 112 instructs the wireless LAN interface 108 to execute a procedure for connecting with the selected connection target (step S42). Thus, a wireless LAN connection with a connection target that is a target determined by the user is established.

(2) Connection Target Selection Process—First Example

Figure 4A:
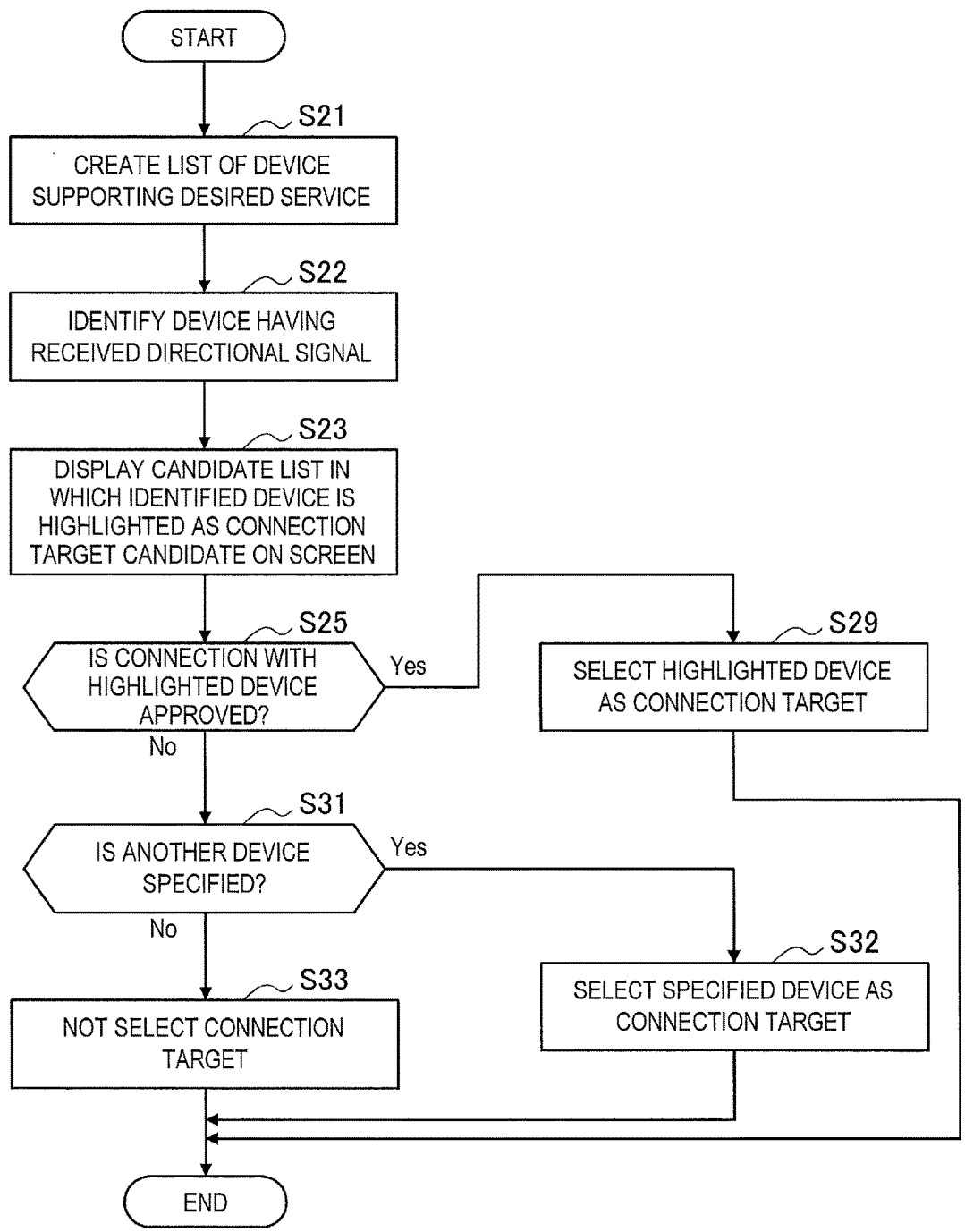
FIG. 4A is a flowchart illustrating a first example of a detailed processing procedure of a connection target selection process shown in FIG. 3.

FIG. 4A is a flowchart illustrating a first example of the detailed processing procedure of the connection target selection process shown in FIG. 3. Referring to FIG. 4A, the controller 112 creates a list of response side devices that support a desired service (e.g., transmission of a display video such as Miracast (registered trademark), content reproduction, printing, or data exchange) based on a result obtained from the service inquiry (step S21). The controller 112 identifies a device that receives the directional signal sent from the infrared interface 107 among the response side devices (step S22). The identified device is a sending source device that sends the service response signal that contains the reception indicator of the directional signal.

The controller 112 allows a candidate list that displays the identified devices as a candidate for a connection target in a highlighted manner to be displayed on a screen of the display device 104 (step S23). The subsequent processing branches depending on the user input. For example, when a connection with a connection target candidate displayed in a highlighted manner is approved by the user (step S25), the controller 112 selects a device displayed in a highlighted manner as a connection target (step S29). If the user specifies another device (step S31), the controller 112 selects the specified other device as a connection target (step S32). On the other hand, if a connection is not approved and other device is not specified, the controller 112 does not select any device as a connection target (step S33).

(3) Connection Target Selection Process—Second Example

Figure 4B:
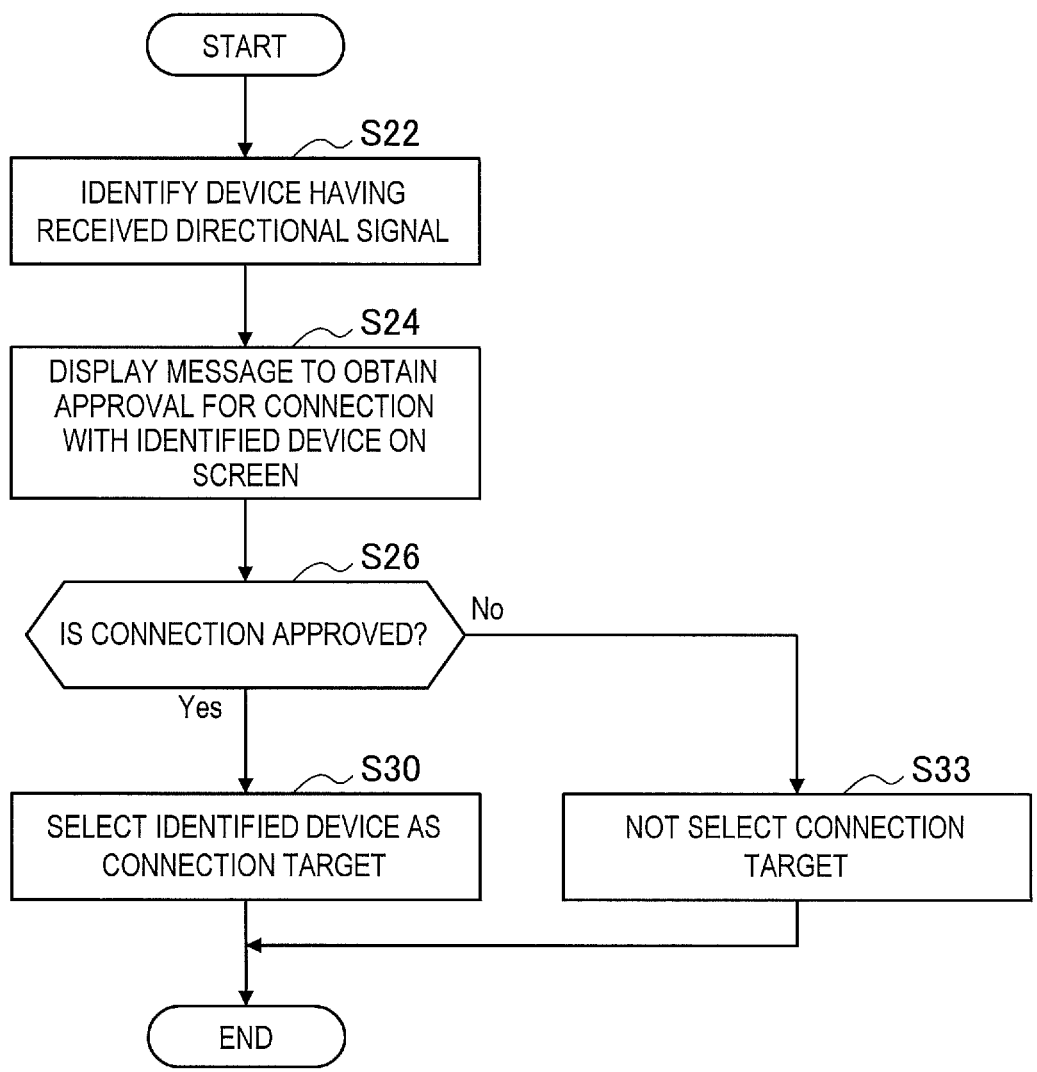
FIG. 4B is a flowchart illustrating a second example of a detailed processing procedure of a connection target selection process shown in FIG. 3.

FIG. 4B is a flowchart illustrating a second example of the detailed processing procedure of the connection target selection process shown in FIG. 3. Referring to FIG. 4B, the controller 112 identifies a device that receives the directional signal sent from the infrared interface 107 among the response side devices based on a result obtained from the service inquiry (step S22). The identified device is a sending source device that sends the service response signal that contains the reception indicator of the directional signal. The controller 112 allows a message used to obtain an approval for the establishment of a wireless LAN connection to be displayed on a screen of the display device 104 (step S24). Then, if the connection is approved by the user (step S26), the controller 112 selects the device identified based on the result obtained from the service inquiry as a connection target (step S30). On the other hand, if the connection is not approved, the controller 112 does not select any connection target (step S33).

(4) Connection Target Selection Process—Third Example

Figure 4C:
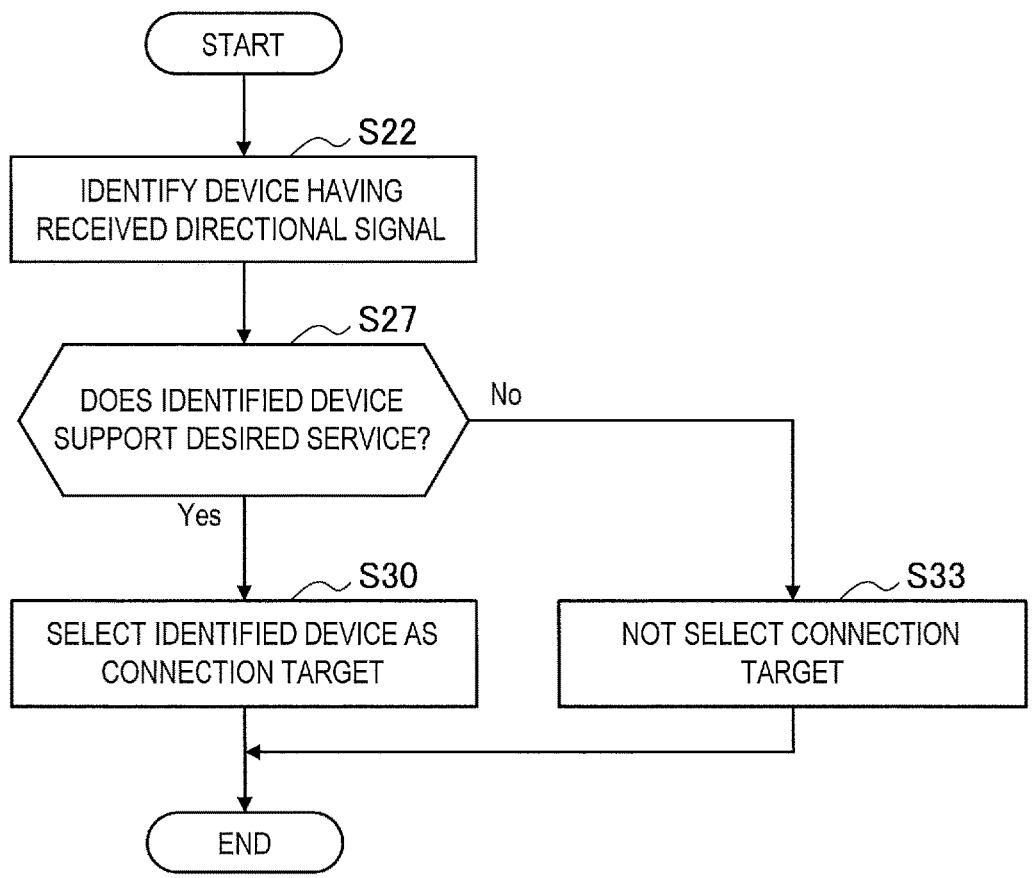
FIG. 4C is a flowchart illustrating a third example of a detailed processing procedure of a connection target selection process shown in FIG. 3.

FIG. 4C is a flowchart illustrating a third example of the detailed processing procedure of the connection target selection process shown in FIG. 3. Referring to FIG. 4C, the controller 112 identifies a device that receives the directional signal sent from the infrared interface 107 among the response side devices based on a result obtained from the service inquiry (step S22). The identified device is a sending source device that sends the service response signal that contains the reception indicator of the directional signal. Then, the controller 112 determines whether the identified device supports a desired service (step S27). If the identified device supports a desired service, the controller 112 selects automatically the identified device as a connection target (step S30). On the other hand, if the identified device does not support a desired service, the controller 112 dose not select any connection target (step S33).

(5) Connection Target Selection Process—Fourth Example

Figure 4D:
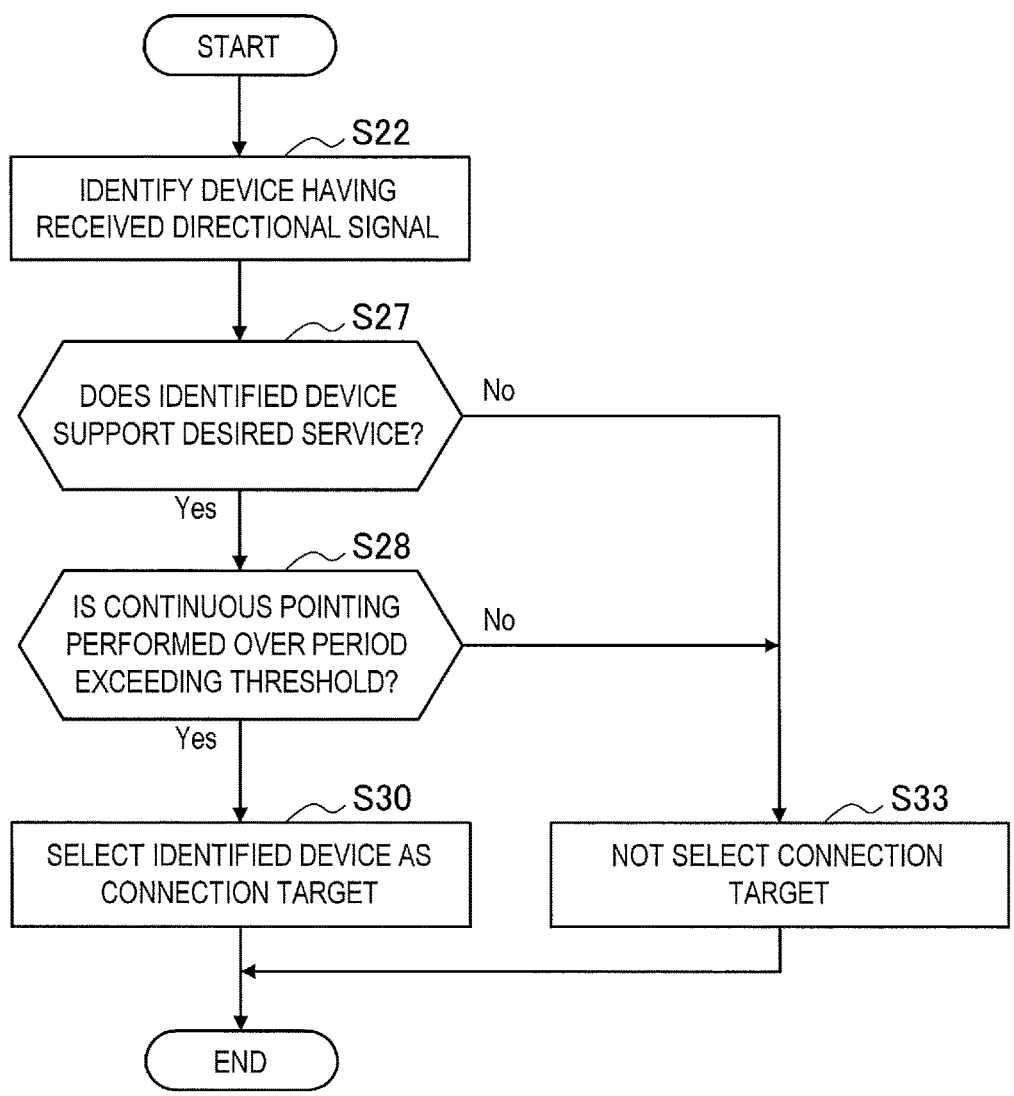
FIG. 4D is a flowchart illustrating a fourth example of a detailed processing procedure of a connection target selection process shown in FIG. 3.

FIG. 4D is a flowchart illustrating a fourth example of the detailed processing procedure of the connection target selection process shown in FIG. 3. Referring to FIG. 4D, the controller 112 identifies a device that receives the directional signal sent from the infrared interface 107 among the response side devices based on a result obtained from the service inquiry (step S22). The identified device is a sending source device that sends the service response signal that contains the reception indicator of the directional signal. Then, the controller 112 determines whether the identified device supports a desired service (step S27). The controller 112 determines whether the same device is pointed continuously over a period that exceeds a predetermined threshold (step S28). If the identified device supports a desired service and is pointed continuously over a period exceeding a predetermined threshold, the controller 112 selects automatically the identified device as a connection target (step S30). On the other hand, if the identified device does not support a desired service or the same device is not pointed continuously, the controller 112 dose not select any connection target (step S33).

3. EXEMPLARY CONFIGURATION OF RESPONSE SIDE

3-1. Device Configuration

Figure 5:
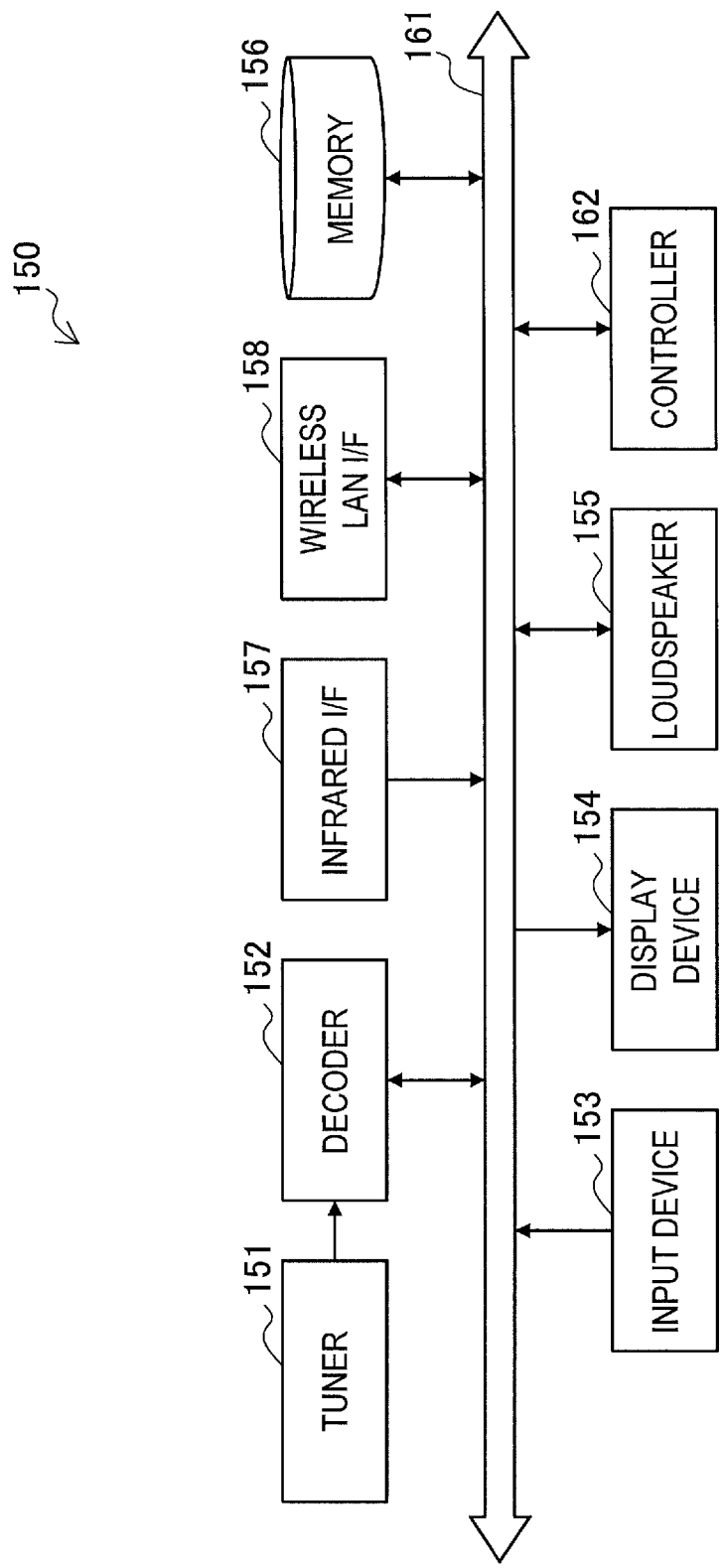
FIG. 5 is a block diagram illustrating an exemplary configuration of a wireless communication device on the response side according to one embodiment.

FIG. 5 is a block diagram illustrating an exemplary configuration of the wireless communication device 150 on the response side. Although the description is given of only an example of a television device to avoid the description from being redundant, the description herein is applicable to other types of electronic devices. Referring to FIG. 5, the wireless communication device 150 is configured to include a tuner 151, a decoder 152, an input device 153, a display device 154, a loudspeaker 155, a memory 156, an infrared interface 157, a wireless LAN interface 158, a bus 161, and a controller 162.

The tuner 151 extracts and demodulates a signal of a desired channel from broadcasting signals received via an antenna (not shown) or a cable. The decoder 152 decodes the content from the signal demodulated by the tuner 151. The input device 153 includes, for example, a button or a switch, and receives an operation performed by the user. The display device 154 has a screen such as a liquid crystal display, a plasma display, and an organic light emitting diode display. The loudspeaker 155 converts an audio signal outputted from the wireless communication device 150 to sound. The memory 156 includes a RAM and ROM. Data and a program executed by the controller 162 described later are stored in the memory 156.

The infrared interface 157 is a first wireless interface capable of receiving a directional signal that is a wireless signal (infrared signal) having directivity. The infrared interface 107 monitors constantly whether a signal is received. The infrared interface 107, when receiving a directional signal, outputs management information contained in the received directional signal to the controller 162. Unlike infrared interface 107 of the requesting side device, the infrared interface 157 may be configured to include only a light-receiving unit without a light-emitting unit.

The wireless LAN interface 158 is a second wireless interface that operates in accordance with the wireless LAN mode. The wireless LAN interface 158 may establish a peer-to-peer wireless connection with the request side device according to the connection procedure using Wi-Fi Direct or in ad-hoc mode. The wireless connection established by the wireless LAN interface 158 may be used to transmit any type of data including display video data, content data, print data, and application data.

The wireless LAN interface 158 sends a service response signal as a response to the service inquiry signal received from the request side device. The service response signal is a signal used to notify service information about the service supported by the response side device to the request side device. The wireless LAN interface 158 sends a search response signal as a response to the search signal received from the request side device. As an example, when a wireless connection over Wi-Fi Direct is used, the search response signal may be the probe response in the device discovery procedure using Wi-Fi Direct. The wireless LAN interface 158 may execute the search for a connection target by oneself. The search for a connection target may be started with reception of a directional signal as a trigger, or may be executed periodically regardless of reception of a directional signal.

The bus 161 connects the tuner 151, the decoder 152, the input device 153, the display device 154, the loudspeaker 155, the memory 156, the infrared interface 157, the wireless LAN interface 158, and the controller 162 with each other.

The controller 162 may be a CPU or a SoC. The controller 112 controls the entire function of the wireless communication device 150. For example, when the above-mentioned directional signal is received by the infrared interface 157, the controller 162 instructs the wireless LAN interface 158 to send a service response signal including a reception indicator, which indicates that the directional signal is received, to the request side device that searches for a connection target in the wireless LAN mode. As described above, the service response signal may be a response signal to the service inquiry signal received by the wireless LAN interface 158.

As an example, when a directional signal is received by the infrared interface 157, the controller 162 allows management information contained in the directional signal to be stored in the memory 156 together with a time stamp indicating the received time. Then, when a service inquiry signal is received by the wireless LAN interface 158, the controller 162 collates identification information for identifying a sending source device that has sent the service inquiry signal contained in the service inquiry signal with identification information in the management information stored in the memory 156. When these types of identification information match with each other, the controller 162 may instruct the wireless LAN interface 158 to send a service response signal that contains a reception indicator of the directional signal as a response to the service inquiry signal. In this case, it is possible to implement the reception indicator as a one-bit flag. Alternatively, the controller 162 may insert the identification information obtained from the directional signal into the service response signal as a reception indicator. In this case, the collation between identification information is possible to be executed in the request side device rather than the response side device.

The controller 162 may determine whether protocol information that may be contained in the management information matches the protocol of a service supported by the wireless communication device 150. If the protocol information does not match the protocol, the controller 162 may allow the service response signal to be sent back to the request side device, rather than the reception indicator is inserted into the service response signal. Alternatively, the controller 162 may insert an indicator indicating that the information does not match the protocol into the service response signal.

When the service inquiry signal is received by the wireless LAN interface 158, the controller 162 may allow the service response signal that contains the above-mentioned reception indicator to be sent from the wireless LAN interface 158 under a condition that the time elapsed from the previous reception of the directional signal falls below a threshold. More specifically, the controller 162 compares the time, which is elapsed from the time at which a directional signal is received as indicated by the time stamp stored in the memory 156 to the time at which the service inquiry signal is received, with a predetermined threshold. If the elapsed time falls below the threshold, the controller 162 inserts the above-mentioned reception indicator into the service response signal. On the other hand, if the elapsed time exceeds the threshold or no time stamp is stored, a reception indicator is not inserted into the service response signal. This makes it possible for the response side device to send back the reception indicator accurately based on the situation of the user's latest pointing action.

When the directional signal is received by the infrared interface 157, the controller 162 may allow an indication object, which is used to indicate that the wireless communication device 150 is a connection target candidate for a wireless LAN connection, to be displayed on a screen of the display device 154. The indication object being displayed may be, for example, a text message or an icon. The controller 162 may allow a ramp provided in the wireless communication device 150 to be turned on or off. When the user is pointing at the wireless communication device 150, the user is likely to view the wireless communication device 150 rather than the request side device. Thus, such a visual feedback performed in the wireless communication device 150 acting as the response side device makes it possible for the user to recognize effectively a device at which the user is pointing.

After the service response signal that contains a reception indicator of a directional signal is sent from the wireless LAN interface 158 to the request side device, the request side device may start to perform the connection procedure for a wireless LAN connection. When the wireless communication device 150 is selected as a connection target of the wireless LAN connection by the request side device, the controller 162 executes the connection procedure for the wireless LAN connection with the request side device and establishes the wireless LAN connection.

Even when the whole or some of the wireless communication devices 150 are in powered-off state (sleep state), the infrared interface 157 may wait for an infrared signal to be received. Meanwhile, the wireless LAN interface 158 also may be in powered-off state. When the above-mentioned directional signal is received by the infrared interface 157, the wireless LAN interface 158 (or the whole of the wireless communication devices 150) may be turned on. This makes it possible to reduce the power consumption of the wireless communication device 150.

As is the case with the description of the request side device, even in the response side device, a combination of wireless interfaces is not limited to the above example. For example, a wireless interface for sending a visible light signal or a millimeter-wave signal in place of the infrared signal may be used as the first wireless interface for sending a directional signal. The UWB communication interface such as wireless USB signal may be used as the second wireless interface.

3-2. Processing Procedure

Figure 6:
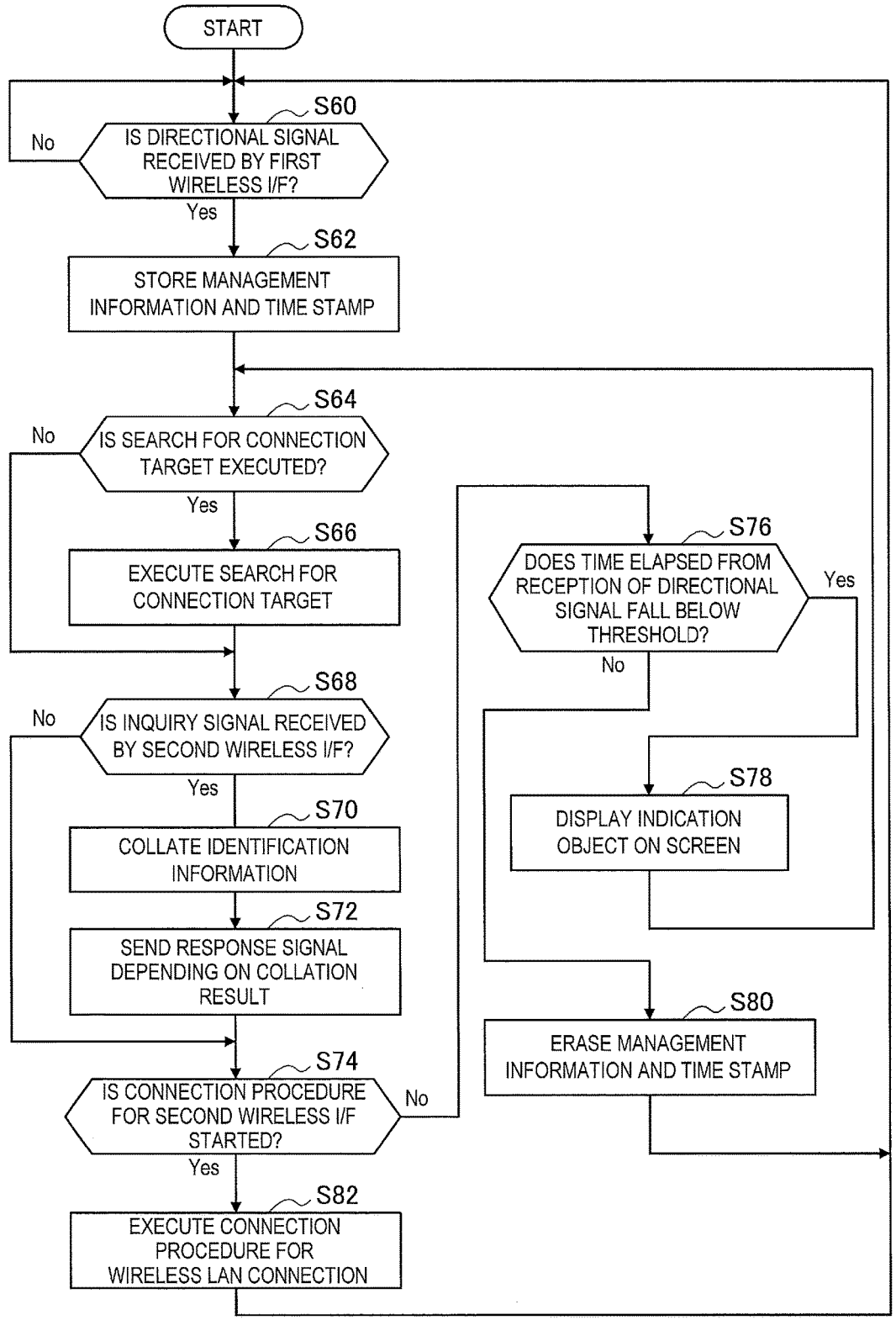
FIG. 6 is a flowchart illustrating an exemplary processing procedure performed by the wireless communication device on the response side according to one embodiment.

FIG. 6 is a flowchart illustrating an exemplary processing procedure performed by the wireless communication device 150 according to the present embodiment.

Referring to FIG. 6, the infrared interface 157 (the first wireless I/F) waits for the reception of a directional signal from the request side device (step S60). If the directional signal sent from the request side device is received by the infrared interface 157, the controller 162 allows the management information extracted from the directional signal and its time stamp to be stored in the memory 156 (step S62).

The controller 162 determines whether to execute a search for a connection target (step S64). If it is determined to execute a search for a connection target, the controller 162 executes a search (e.g., the device discovery procedure using Wi-Fi Direct) for a connection target (step S66). For example, when the wireless LAN interface 158 sends a search signal, the request side device that has received the search signal may detect the wireless communication device 150 as the response side device. Even when the wireless LAN interface 158 sends a search response signal as a response to the search signal received from the request side device, the request side device that has received the search response signal may detect the wireless communication device 150 as the response side device.

The wireless LAN interface 158 (the second wireless I/F) waits for the reception of a service inquiry signal sent from the request side device (step S68). When the service inquiry signal from the request side device is received by the wireless LAN interface 158, the controller 162 collates identification information for identifying a sending source device which has sent the service inquiry signal contained in the service inquiry signal with the identification information obtained from the memory 156 (step S70). The controller 162 may perform a collation operation between protocol information as necessary. The controller 162 collates the time elapsed from the time at which a directional signal is received to the time at which the service inquiry signal is received with a predetermined threshold using the time stamp stored in the memory 156. The controller 162 instructs the wireless LAN interface 158 to send the service response signal to the request side device (step S72). For example, if the comparison between the identification information is successful (or if the time elapsed from the time at which a directional signal is received falls below a threshold), the service response signal to be sent may contain a reception indicator of the directional signal.

Then, the wireless LAN interface 158 waits for a request for triggering the start of the connection procedure for the wireless LAN connection with the request side device to be received (step S74). If the connection procedure is not started, the controller 162 determines whether the time elapsed from the previous reception of the directional signal falls below a threshold (step S76). If the elapsed time falls below a threshold, the controller 162 allows an indication object, which is used to indicate that the wireless communication device 150 is a connection target candidate for a wireless LAN connection, to be displayed on a screen of the display device 154 (step S78). Meanwhile, if the time elapsed from the previous reception of the directional signal reaches a threshold, the controller 162 erases the management information, which is extracted from the directional signal, and the time stamp from the memory 156 (step S80).

Meanwhile, if a request for triggering the start of the connection procedure is received from the request side device via the wireless LAN interface 158, the controller 162 executes the connection procedure for a wireless LAN connection between the wireless LAN interface 158 and the request side device, and establishes the wireless LAN connection (step S82).

4. EXEMPLARY USER INTERFACE

(1) First Example

Figure 7A:
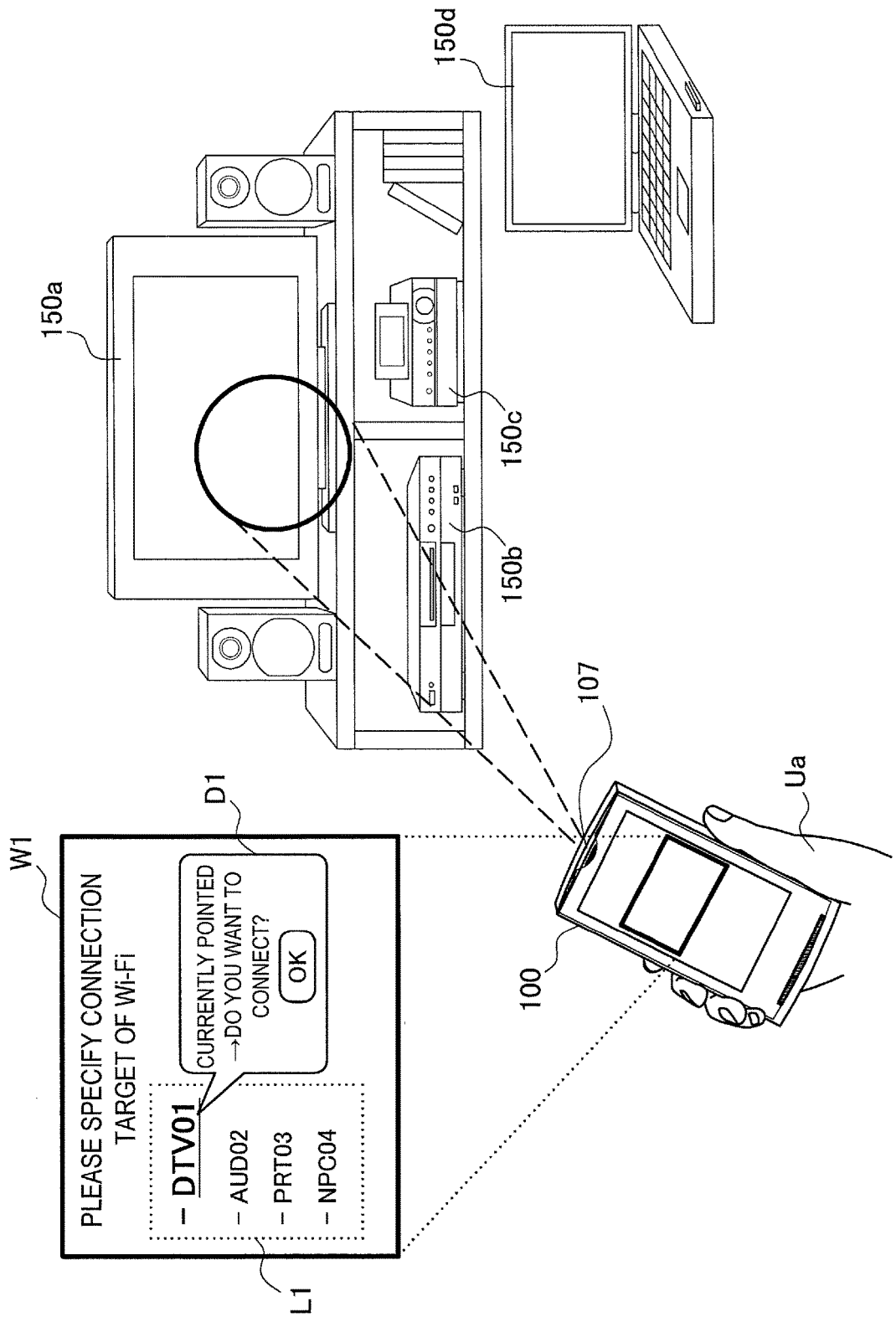
FIG. 7A is a first explanatory diagram for describing a first example of the user interface.
Figure 7B:
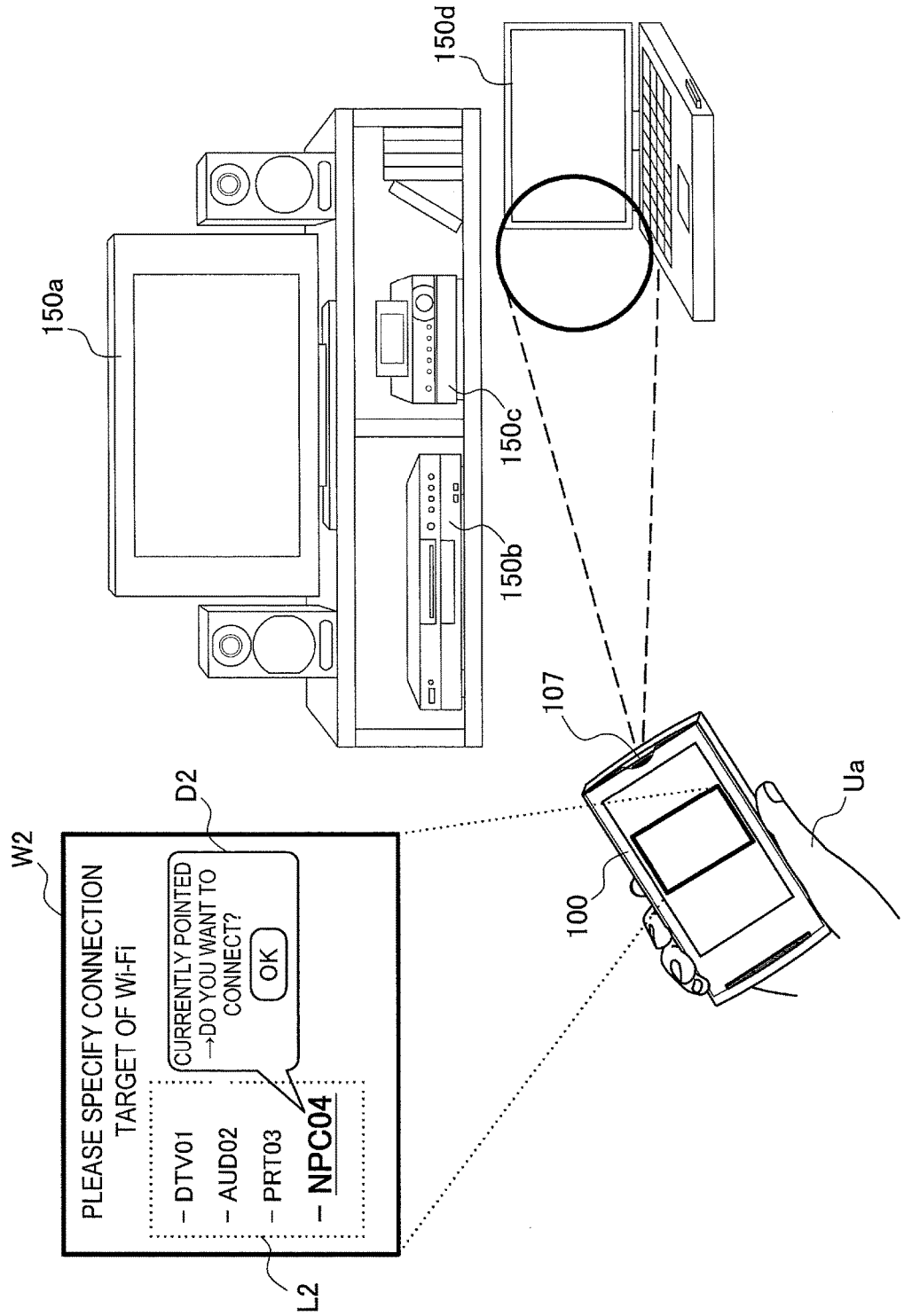
FIG. 7B is a second explanatory diagram for describing a first example of the user interface.

FIGS. 7A and 7B are diagrams illustrated to describe a first example of a user interface that may be employed in the communication control system 1. Referring to FIG. 7A, the user Ua directs the optical axis of the infrared interface 107 in the wireless communication device 100 toward a wireless communication device 150a. The wireless communication device 100 has a screen on which a window W1 is displayed. The window W1 contains a list L1 of response side devices created based on a result obtained from the service inquiry and a dialog D1. In the list L1, an item "DTV01" corresponding to the wireless communication device 150a is displayed in a highlighted manner. The dialog D1 indicates the item displayed in a highlighted manner, and asks for the approval of the user Ua to establish a wireless LAN connection with the wireless communication device 150a. The user Ua may simply tap the dialog D1 to approve the wireless LAN connection.

Referring to FIG. 7B, the user Ua changes the orientation of the wireless communication device 100 to direct the optical axis of the infrared interface 107 toward the wireless communication device 150d. A window W2 is displayed on a screen of the wireless communication device 100. The window W2 contains a list L2 of response side devices created newly based on a result obtained from the service inquiry and a dialog D2. In the list L2, an item "NPC04" corresponding to the wireless communication device 150d is displayed in a highlighted manner. The dialog D2 indicates the item displayed in a highlighted manner, and asks for the approval of the user Ua to establish a wireless LAN connection with the wireless communication device 150d. The user Ua can view the windows W1 and W2 as illustrated in FIGS. 7A and 7B while moving the wireless communication device 100, and thus it is possible for the user to recognize easily a device at which the user is pointing and a device with which a wireless LAN connection is established.

In FIGS. 7A and 7B, the items corresponding to a candidate for a connection target determined based on the result obtained from the service inquiry are displayed in a highlighted manner by enlarging a font size and drawing the underline. However, a method of highlighting is not limited to such examples. For example, the highlighting of an item may be done by being subjected to coloring, shaping, or moving it for being different from others, or by making other items translucent. The item contained in the list may be a character string as illustrated in FIGS. 7A and 7B, or may be other type of object such as an icon or a photograph.

(2) Second Example

Figure 8:
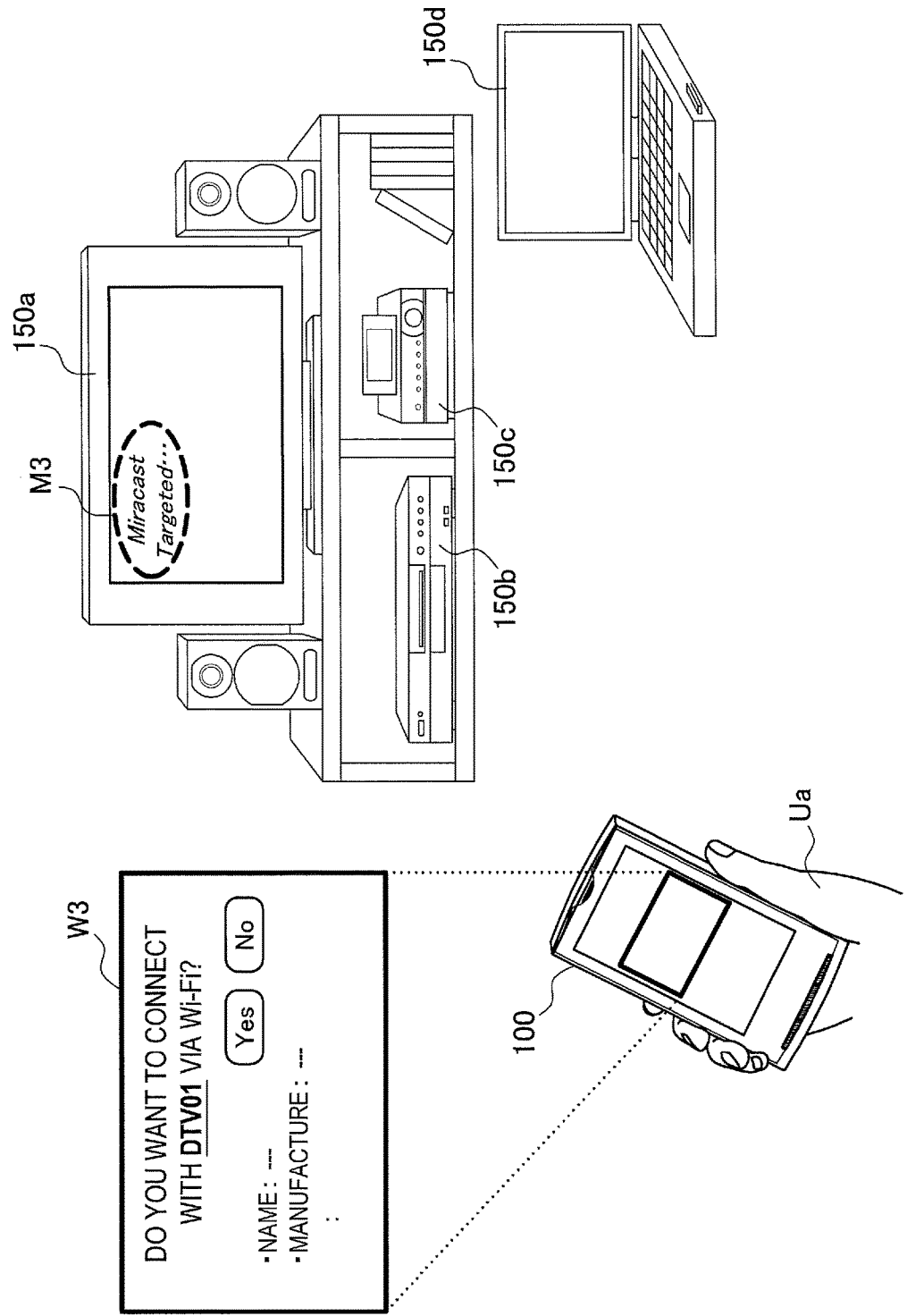
FIG. 8 is a diagram illustrated to describe a second example of the user interface.

FIG. 8 is a diagram illustrated to describe a second example of the user interface that may be employed in the communication control system 1. Referring to FIG. 8, the user Ua directs the optical axis of the infrared interface 107 in the wireless communication device 100 toward the wireless communication device 150a. A window W3 is displayed on a screen of the wireless communication device 100. The window W3 indicates detailed information on the wireless communication device 150a that is a candidate of a connection target determined based on a result obtained from the service inquiry. The user Ua can tap a button displayed on the window W3 to approve a wireless LAN connection with the wireless communication device 150a or reject the connection. A message M3 is displayed on a screen of the wireless communication device 150a which has received a directional signal sent from the infrared interface 107 of the wireless communication device 100. The message M3 shows that the wireless communication device 150a is a candidate for a connection target to be connected to the wireless communication device 100 for the user Ua. The user Ua can view the message M3 to recognize easily whether a device as a target is properly pointed.

5. EXEMPLARY SIGNAL FORMAT (1) Service Inquiry Signal

Figure 9:
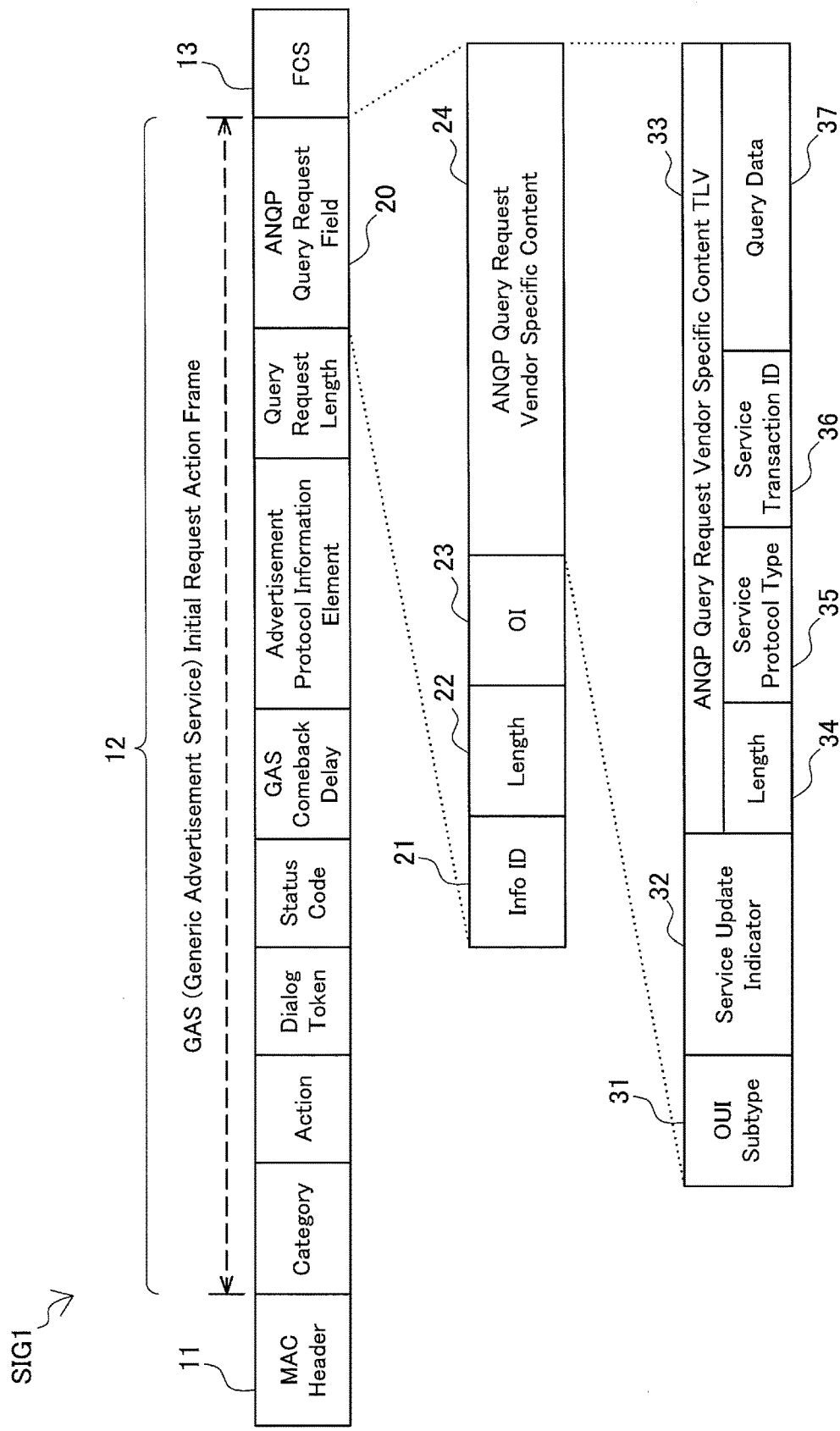
FIG. 9 is a diagram illustrated to describe an exemplary format of a service inquiry signal.

FIG. 9 is a diagram illustrated to describe an exemplary format of a service inquiry signal sent from the request side device to the response side device. In the example of FIG. 9, the service inquiry signal SIG1 is the service discovery request in the service discovery procedure using Wi-Fi Direct. The service inquiry signal SIG1 includes an MAC header 11, a general advertisement service (GAS) initial request action frame 12, and a frame check sequence (FCS) 13. The GAS initial request action frame 12 has a format standardized in IEEE802.11u, and includes an access network query protocol (ANQP) query request field 20. The ANQP query request field 20 includes an information ID (Info ID) 21 in which a vendor specific value is set, a length 22 in which data length is set, an organization identifier (OI) 23 in which a value indicating Wi-Fi Alliance (WFA) is set, and an ANQP query request vendor specific content 24. The ANQP query request vendor specific content 24 includes an OUI subtype 31, a service update indicator 32, and a type-length-value (TLV) field 33. The TLV field 33 includes a length 34, a service protocol type 35, a service transaction ID 36, and a query data 37. A value that may be set in the service protocol type 35 is defined as shown in the following Table 1.

TABLE 1

Service Protocol Type

| Value | Meaning |
| --- | --- |
| 0 | All Service Protocol Types |
| 1 | Bonjour |
| 2 | UPnP (Universal Plug and Play) |
| 3 | WS-Discovery (Web Services Dynamic Discovery) |
| 4-254 | Reserved |
| 255 | Vendor Specific |

For example, the controller 112 of the wireless communication device 100 may set a value "255" indicating that the service inquiry signal SIG 1 contains vendor specific information in the service protocol type 35 of the service inquiry signal SIG 1. The controller 112 may set the above-mentioned management information in the service transaction ID 36 or the query data 37. Alternatively, the controller 112 may set one value of reserved values "4" to "254" in the service protocol type 35 of the service inquiry signal SIG 1. In the latter case, a value to be set in the service inquiry signal SIG1 can be defined as a standard specification, thereby achieving compatibility between vendors.

(2) Service Response Signal

Figure 10:
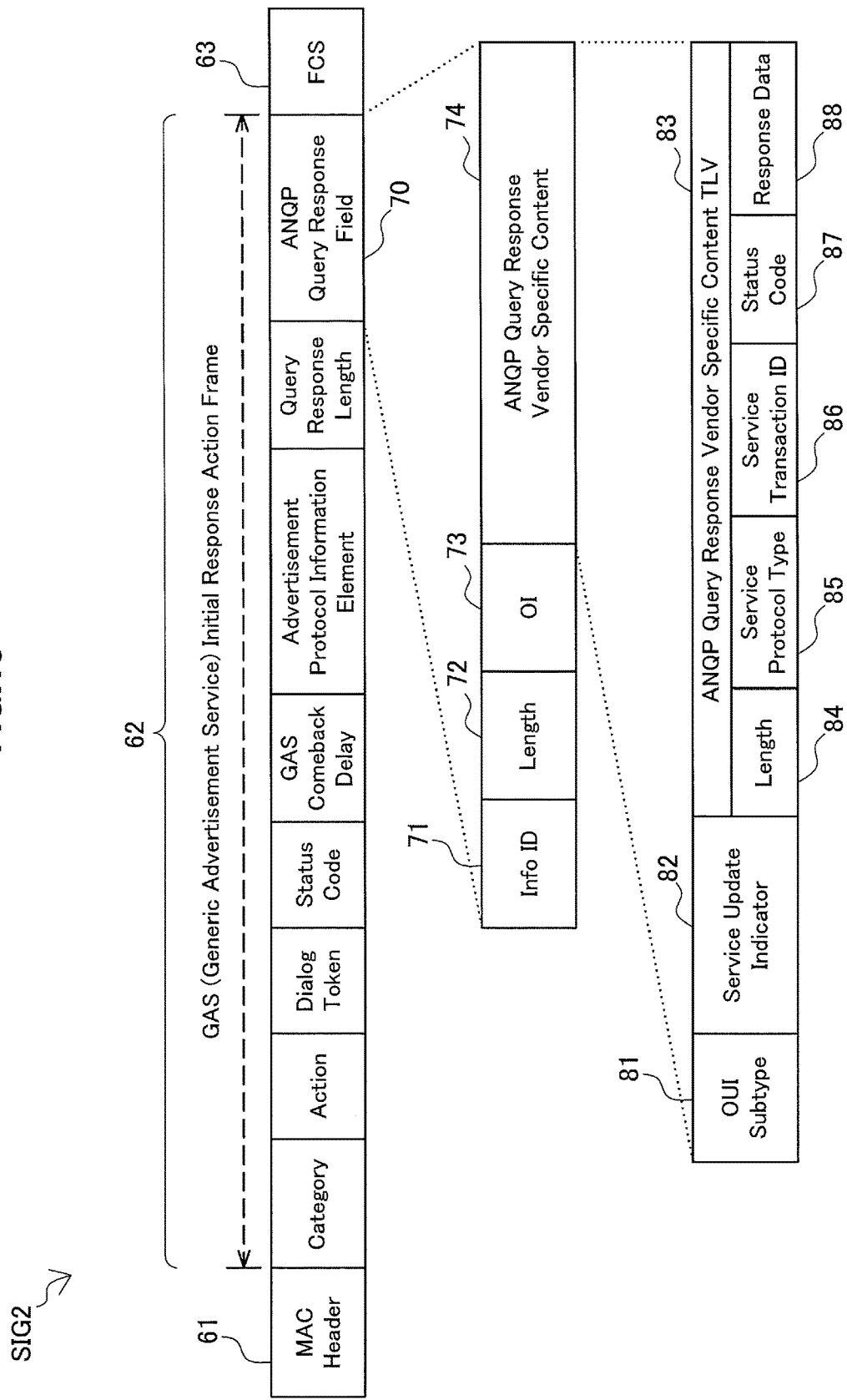
FIG. 10 is a diagram illustrated to describe an exemplary format of a service inquiry signal.

FIG. 10 is a diagram illustrated to describe an exemplary format of a service response signal that is sent back from the response side device to the request side device. In the example of FIG. 10, the service response signal SIG2 is the service discovery response in the service discovery procedure using Wi-Fi Direct. The service response signal SIG2 includes an MAC header 61, a GAS initial response action frame 62, and an FCS 63. The GAS initial response action frame 62 has a format standardized in IEEE802.11u, and includes an ANQP query response field 70. The ANQP query response field 70 includes an information ID (Info ID) 71 in which a vendor specific value is set, a length 72 in which data length is set, an OI 73 in which a value indicating WFA is set, and an ANQP query response vendor specific content 74. The ANQP query response vendor specific content 74 includes an OUI subtype 81, a service update indicator 82, and a TLV field 83. The TLV field 83 includes a length 84, a service protocol type 85, a service transaction ID 86, a status code 87, and a response data 88.

A value to be set in the service protocol type 85 may be the same value as the value to be set in the service protocol type 35 described with reference to FIG. 9. For example, the controller 162 of the wireless communication device 150 may set the reception indicator, which indicates that the directional signal is received by the wireless communication device 150, in the status code 87 or the response data 88 of the service response signal SIG2.

In this way, the reuse of the signal format used in the existing procedure for the service inquiry makes it possible to construct a mechanism capable of easily selecting a connection target for a wireless connection at low cost.

6. PROCESSING SEQUENCE

(1) First Example

Figure 11:
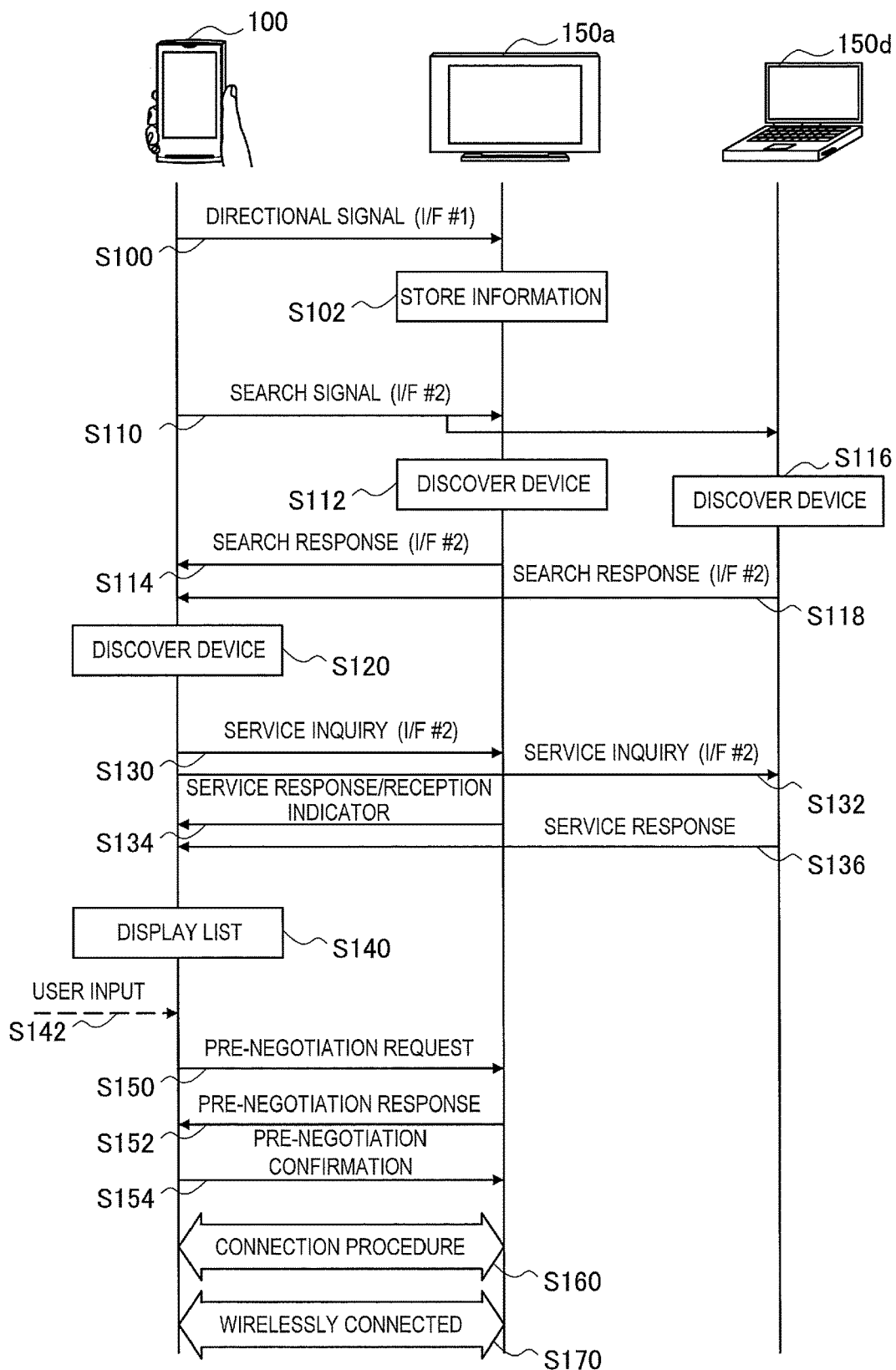
FIG. 11 is a sequence diagram illustrating a first example of a control procedure in the communication control system according to one embodiment.

FIG. 11 is a sequence diagram illustrating a first example of a control procedure in the communication control system 1. In the sequence shown in FIG. 11, the wireless communication device 100, the wireless communication device 150a, and the wireless communication device 150d are assumed to be involved. The wireless communication device 100 is the request side device. The wireless communication device 150a and the wireless communication device 150d are response side devices.

Referring to FIG. 11, the wireless communication device 100 sends a directional signal from the infrared interface 107 (step S100). The directional signal travels to the direction at which the user is pointing, and is received by the wireless communication device 150a via the infrared interface 157. The wireless communication device 150a allows management information contained in the received directional signal to be stored in the memory 156 (step S102).

The wireless communication device 100 sends a search signal from the wireless LAN interface 108 (step S110). The search signal is typically broadcasted to nearby devices, and is received by the wireless communication device 150a and the wireless communication device 150d. The wireless communication device 150a, which has received the search signal, discovers the existence of the wireless communication device 100 (step S112). The wireless communication device 150a sends a search response signal back to the wireless communication device 100 via the wireless LAN interface 158 (step S114). Similarly, the wireless communication device 150d, which has received the search signal, discovers the existence of the wireless communication device 100 (step S116). The wireless communication device 150d sends a search response signal back to the wireless communication device 100 via the wireless LAN interface 158 (step S118).

The wireless communication device 100, which has received the search response signal from the wireless communication device 150a and the wireless communication device 150d, discovers the existence of the wireless communication device 150a and the wireless communication device 150d (step S120). The wireless communication device 100 sends a service inquiry signal to the wireless communication device 150a via the wireless LAN interface 108 (step S130). Similarly, the wireless communication device 100 sends a service inquiry signal to the wireless communication device 150d via the wireless LAN interface 108 (step S132). In the example shown in FIG. 11, the service inquiry signal is a unicast signal (in other examples, a service inquiry signal may be a broadcast signal, or the search signal and the service inquiry signal may be integrated into a single signal).

The wireless communication device 150a, which has received the service inquiry signal from the wireless communication device 100, sends a service response signal back to the wireless communication device 100 via the wireless LAN interface 158 (step S134). The wireless communication device 150a has received the directional signal from the wireless communication device 100 within the most recent predetermined period (in step S100), and thus the wireless communication device 150a inserts a reception indicator indicating that the directional signal is received into the service response signal. Meanwhile, the wireless communication device 150d, which has received the service inquiry signal from the wireless communication device 100, sends a service response signal back to the wireless communication device 100 via the wireless LAN interface 158 (step S136). The wireless communication device 150d does not receive a directional signal within the most recent predetermined period, and thus the wireless communication device 150d does not insert a reception indicator into the service response signal.

The wireless communication device 100, which has received the service response signal from each of the wireless communication device 150a and the wireless communication device 150d, determines that the wireless communication device 150a is a connection target candidate based on whether each service response signal contains a reception indicator. The wireless communication device 100 allows a list of the response side devices that display an item corresponding to the wireless communication device 150a in a highlighted manner to be displayed on a screen (step S140). The user approves the wireless LAN connection between the wireless LAN interface 108 and the wireless communication device 150a, for example, by tapping the screen, pressing a predetermined button, or issuing a predetermined voice command (step S142).

When the connection with the wireless communication device 150a is approved, the wireless communication device 100 sends a pre-negotiation request to the wireless communication device 150a via the wireless LAN interface 108 (step S150). The wireless communication device 150a, which has received the pre-negotiation request, sends a pre-negotiation response back to the wireless communication device 100 via the wireless LAN interface 158 (step S152). The wireless communication device 100 sends a pre-negotiation confirmation to the wireless communication device 150a via the wireless LAN interface 108 (step S154). The pre-negotiation herein may contain a determination of a group owner (GO) in a case where a wireless LAN connection is established over Wi-Fi Direct. The GO is a device acting as an access point. In this case, the pre-negotiation request, the pre-negotiation response, and the pre-negotiation confirmation may correspond to the GO negotiation request, the GO negotiation response, and the GO negotiation confirm, respectively. Such pre-negotiation prior to the start of the connection procedure may be omitted, or other types of pre-negotiation may be performed.

When the pre-negotiation request, the pre-negotiation response, and the pre-negotiation confirmation are exchanged successfully, the connection procedure for the wireless LAN connection is executed between the wireless LAN interface 108 of the wireless communication device 100 and the wireless LAN interface 158 of the wireless communication device 150a (step S160). The connection procedure herein may contain a security setting and an exchange of encryption keys. The established wireless LAN connection allows data traffic to be transmitted (step S170). As an example, the wireless communication device 100 may transmit a display video to the wireless communication device 150a via the wireless LAN connection, and a series of images that constitutes the transmitted display video (instead of video, a still image may be transmitted) may be displayed by the display device 154 of the wireless communication device 150a.

(2) Second Example

Figure 12:
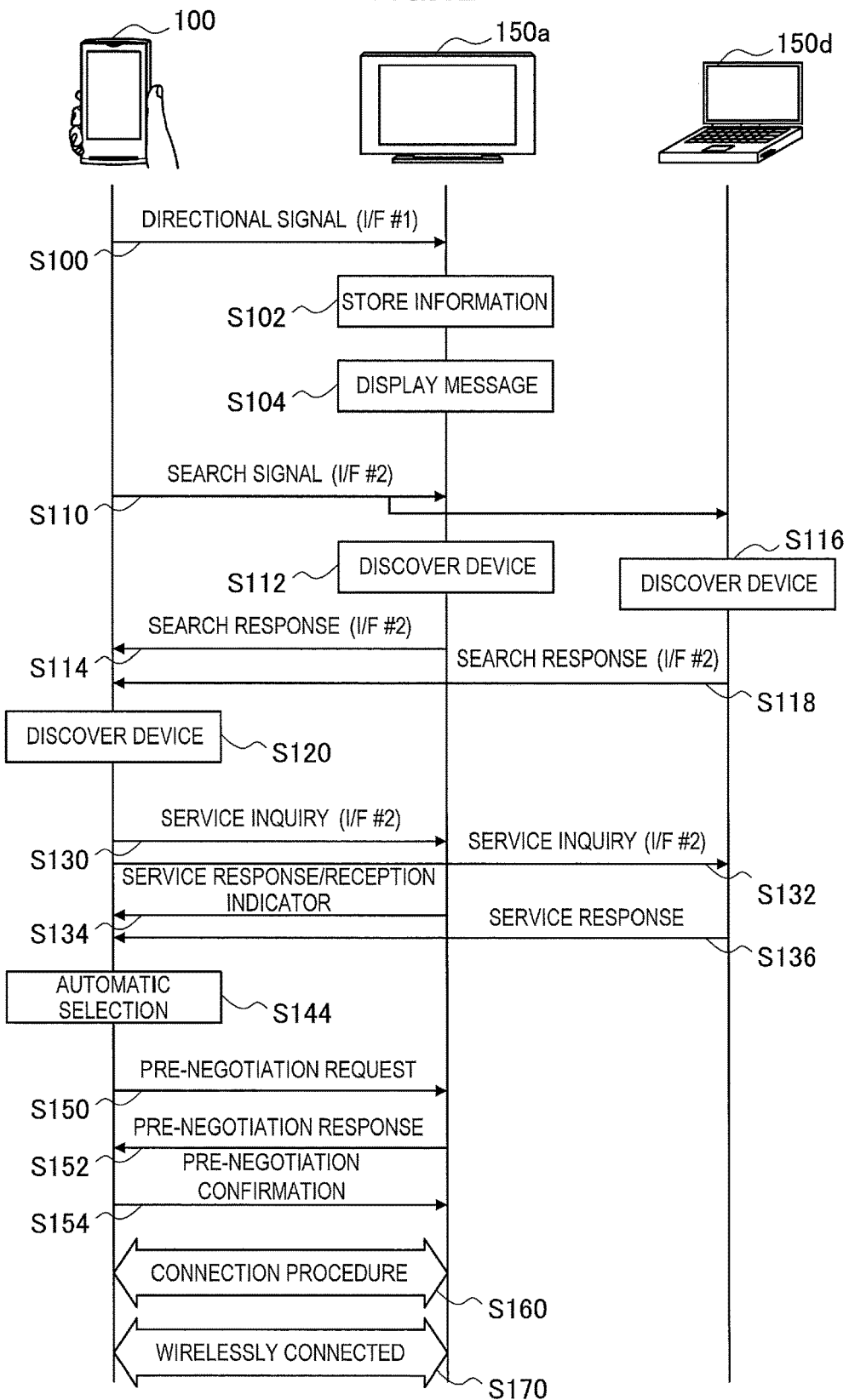
FIG. 12 is a sequence diagram illustrating a second example of a control procedure in the communication control system according to one embodiment.

FIG. 12 is a sequence diagram illustrating a second example of a control procedure in the communication control system 1. In the sequence shown in FIG. 12, the wireless communication device 100, the wireless communication device 150a, and the wireless communication device 150d are assumed to be involved. The wireless communication device 100 is the request side device. The wireless communication device 150a and the wireless communication device 150d are response side devices.

Referring to FIG. 12, the wireless communication device 100 sends a directional signal from the infrared interface 107 (step S100). The directional signal travels to the direction at which the user is pointing, and is received by the wireless communication device 150a via the infrared interface 157. The wireless communication device 150a allows management information contained in the received directional signal to be stored in the memory 156 (step S102). The wireless communication device 150a allows an indication object, such as a text message indicating that the wireless communication device 150a is a connection target candidate for a wireless LAN connection, to be displayed on a screen (step S104).

The wireless communication device 100 sends a search signal from the wireless LAN interface 108 (step S110). The search signal is typically broadcasted to nearby devices, and is received by the wireless communication device 150a and the wireless communication device 150d. The wireless communication device 150a, which has received the search signal, discovers the existence of the wireless communication device 100 (step S112). The wireless communication device 150a sends a search response signal back to the wireless communication device 100 via the wireless LAN interface 158 (step S114). Similarly, the wireless communication device 150d, which has received the search signal, discovers the existence of the wireless communication device 100 (step S116). The wireless communication device 150d sends a search response signal back to the wireless communication device 100 via the wireless LAN interface 158 (step S118).

The wireless communication device 100, which has received the search response signal from the wireless communication device 150a and the wireless communication device 150d, discovers the existence of the wireless communication device 150a and the wireless communication device 150d (step S120). The wireless communication device 100 sends a service inquiry signal to the wireless communication device 150a via the wireless LAN interface 108 (step S130). Similarly, the wireless communication device 100 sends a service inquiry signal to the wireless communication device 150d via the wireless LAN interface 108 (step S132).

The wireless communication device 150a, which has received the service inquiry signal from the wireless communication device 100, sends a service response signal back to the wireless communication device 100 via the wireless LAN interface 158 (step S134). The wireless communication device 150a has received the directional signal from the wireless communication device 100 within the most recent predetermined period, and thus the wireless communication device 150a inserts a reception indicator indicating that the directional signal is received into the service response signal. Meanwhile, the wireless communication device 150d, which has received the service inquiry signal from the wireless communication device 100, sends a service response signal back to the wireless communication device 100 via the wireless LAN interface 158 (step S136). Thus the wireless communication device 150d does not insert a reception indicator into the service response signal.

The wireless communication device 100, which has received the service response signal from the wireless communication device 150a and the wireless communication device 150d, determines that the wireless communication device 150a is a connection target candidate based on whether each service response signal contains a reception indicator. In the second example, the wireless communication device 100 does not ask for the user's approval of the wireless LAN connection with the wireless communication device 150a that is the determined connection target candidate. For example, when the service response signal that contains a reception indicator is continuously received from the wireless communication device 150a over the predetermined number of times or period, the wireless communication device 100 may automatically select the wireless communication device 150a as a connection target (step S144).

The wireless communication device 100 sends a pre-negotiation request to the wireless communication device 150a, which is a connection target determined based on the service response signal, via the wireless LAN interface 108 (step S150). The wireless communication device 150a, which has received the pre-negotiation request, sends a pre-negotiation response back to the wireless communication device 100 via the wireless LAN interface 158 (step S152). The wireless communication device 100 sends a pre-negotiation confirmation to the wireless communication device 150a via the wireless LAN interface 108 (step S154).

When the pre-negotiation request, the pre-negotiation response, and the pre-negotiation confirmation are exchanged successfully, the connection procedure for the wireless LAN connection is executed between the wireless LAN interface 108 of the wireless communication device 100 and the wireless LAN interface 158 of the wireless communication device 150a (step S160). The established wireless LAN connection (e.g., possible to include display video data) allows data traffic to be transmitted (step S170).

(3) Third Example

FIG. 13 is a sequence diagram illustrating a third example of a control procedure in the communication control system 1. In the sequence shown in FIG. 13, the wireless communication device 100, the wireless communication device 150a, and the wireless communication device 150d are assumed to be involved. The wireless communication device 100 is the request side device. The wireless communication device 150a and the wireless communication device 150d are response side devices. At the beginning of the sequence, the wireless communication device 150a and the wireless communication device 150d are in a sleep state.

Referring to FIG. 13, the wireless communication device 100 sends a search signal from the wireless LAN interface 108 (step S98). However, the wireless LAN interface 158 of the wireless communication device 150*a* is in a sleep state, the search signal is not received by the wireless communication device 150*a*. Similarly, the wireless LAN interface 158 of the wireless communication device 150*d* is also in a sleep state, and thus the search signal is not received by the wireless communication device 150*d*.

Next, the wireless communication device 100 sends a directional signal from the infrared interface 107 (step S100). The directional signal travels to the direction at which the user is pointing, and is received by the wireless communication device 150*a* via the infrared interface 157. The wireless communication device 150*a* allows management information contained in the received directional signal to be stored in the memory 156 (step S102). The wireless LAN interface 158 of the wireless communication device 150*a* is activated (step S106).

The wireless communication device 100 sends a search signal again from the wireless LAN interface 108 (step S110). The search signal is received by the wireless communication device 150*a* via the wireless LAN interface 158. Meanwhile, the wireless communication device 150*d* still does not receive the search signal. The wireless communication device 150*a*, which has received the search signal, discovers the existence of the wireless communication device 100 (step S112). The wireless communication device 150*a* sends a search response signal back to the wireless communication device 100 via the wireless LAN interface 158 (step S114).

The wireless communication device 100, which has received the search response signal from the wireless communication device 150*a*, discovers the existence of the wireless communication device 150*a* (step S120). The wireless communication device 100 sends a service inquiry signal to the wireless communication device 150*a* via the wireless LAN interface 108 (step S130).

The wireless communication device 150*a*, which has received the service inquiry signal from the wireless communication device 100, sends a service response signal back to the wireless communication device 100 via the wireless LAN interface 158 (step S134). The wireless communication device 150*a* has received the directional signal from the wireless communication device 100 within the most recent predetermined period, and thus the wireless communication device 150*a* inserts a reception indicator indicating that the directional signal is received into the service response signal.

The wireless communication device 100, which has received the service response signal from each of the wireless communication device 150*a*, determines that the wireless communication device 150*a* is a connection target candidate based on whether each service response signal contains a reception indicator. The wireless communication device 100 allows a list of the response side devices that display an item corresponding to the wireless communication device 150*a* in a highlighted manner to be displayed on a screen (step S140). The user approves the wireless LAN connection between the wireless LAN interface 108 and the wireless communication device 150*a* (step S142).

When the connection with the wireless communication device 150*a* is approved, the wireless communication device 100 sends a pre-negotiation request to the wireless communication device 150*a* via the wireless LAN interface 108 (step S150). The wireless communication device 150*a*, which has received the pre-negotiation request, sends a pre-negotiation response back to the wireless communication device 100 via the wireless LAN interface 158 (step S152). The wireless communication device 100 sends a pre-negotiation confirmation to the wireless communication device 150*a* via the wireless LAN interface 108 (step S154).

When the pre-negotiation request, the pre-negotiation response, and the pre-negotiation confirmation are exchanged successfully, the connection procedure for the wireless LAN connection is executed between the wireless LAN interface 108 of the wireless communication device 100 and the wireless LAN interface 158 of the wireless communication device 150*a* (step S160). The established wireless LAN connection allows data traffic (that may include display video data, for example) to be transmitted (step S170).

7. CONCLUSION

The embodiments of the technology according to the present disclosure have been described in detail with reference to FIGS. 1 to 13. According to the embodiments described above, in the request side device, when the first wireless signal having directivity is sent from the first wireless interface and the second wireless signal received by the second wireless interface contains the reception indicator of the first wireless signal (an indicator indicating that the first wireless signal is received), the wireless connection is established between the second wireless interface and the sending source device of the second wireless signal. This reception indicator indicates that the sending source device of the second wireless signal is specified by the user as a device to be connected with the second wireless interface. Thus, the user can specify a connection target to be connected with the second wireless interface without losing the way by simply directing the optical axis of the first wireless interface on the request side device toward a connection target. It is possible to eliminate a necessity for the user to move to a place where a connection target is present because of the touch operation.

According to one exemplary embodiment, a connection target, which is determined based on the reception indicator contained in the second wireless signal in the list of devices connectable with the second wireless interface, may be displayed on a screen used for the user to specify a connection target in a highlighted manner. In this case, the user can easily know which item displayed corresponds to which device and know a device at which the user is currently pointing. The user can start accurately a wireless connection with a connection target, for example, by just performing a simple operation such as tapping for the approval of connection.

According to one exemplary embodiment, the wireless connection with a connection target, which is determined based on the reception indicator contained in the second wireless signal, is established automatically without waiting for the user's approval. In this case, it is possible to reduce the time taken to establish the wireless connection and to minimize a burden on the user. The automatic connection may be performed when the plurality of second wireless signals received from the same sending source device over a predetermined number of times or period contain continuously the above-mentioned reception indicator. Such configuration makes it possible to reduce the risk of establishing erroneously the wireless connection with a device that is not a target. It is possible to implement a special user interface that is pointing at the same device for a period of time to select a connection target.

According to the embodiment described above, in the response side device, when the first wireless signal having directivity is received by the first wireless interface, the second wireless signal, which contains a reception indicator indicating that the first wireless signal is received, is sent to the request side device that searches for a target to be connected wirelessly via the second wireless interface for the wireless connection. Thus, the notification that the user is pointing at the response side device as a connection target can be performed from the response side device to the request side device without having the user to perform other operations than the pointing operation.

According to one exemplary embodiment, the reception indicator may be inserted into the second wireless signal under a condition that the time elapsed from the previous reception of the first wireless signal falls below a threshold. Thus, a change in the direction of the request side device by the user allows a response side device sending a reception indicator to be dynamically changed to another device.

According to one exemplary embodiment, the reception indicator may be inserted into the second wireless signal, only when the second wireless signal is sent as a response to the inquiry from the request side device and the identification information of the device having submitted the inquiry matches the identification information contained in the first wireless signal. In this case, the one-to-one relationship between the request side device and the response side device that are involved in the pointing operation becomes apparent, and thus an appropriate peer-to-peer connection can be established even in situations where there are many devices.

A series of processes performed by each apparatus described herein are typically implemented using software. A program included in the software that implements the series of processes is stored in advance, for example, in a storage medium (non-transitory medium) that is provided inside or outside each apparatus. Each program may be read into RAM upon execution and be executed through a processor such as CPU. The technology according to the present disclosure may be implemented as a one-chip module in which a processor for executing such program, a memory having the program stored therein, and a related circuit are integrated.

The processes described above with reference to flowcharts or sequence diagrams may be not necessarily executed in the order illustrated. Some processing steps may be executed in a parallel manner. An additional processing step may be employed or some processing steps may be omitted.

The preferred embodiment(s) of the present disclosure has/have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

A wireless communication device including:
a first wireless interface configured to send a first wireless signal having directivity;
a second wireless interface; and
a controller configured to allow the second wireless interface to establish a connection with a first device when a second wireless signal received by the second wireless interface includes an indicator indicating that the first wireless signal is received by the first device being a sending source device of the second wireless signal.

(2)

The wireless communication device according to (1),
wherein the controller, when the second wireless signal includes the indicator, determines that the first device is specified by a user as a device to be connected with the second wireless interface.

(3)

The wireless communication device according to (1) or (2), further including:
a display unit configured to display a list of devices capable of being connected with the second wireless interface.

(4)

The wireless communication device according to (3),
wherein the controller allows the first device in the list to be displayed in a highlighted manner.

(5)

The wireless communication device according to any one of (1) to (4),
wherein the controller, when a connection with the first device is approved by the user, allows the second wireless interface to establish the connection with the first device.

(6)

The wireless communication device according to (1) or (2),
wherein the controller, when the second wireless signal includes the indicator, allows the second wireless interface to establish a connection with the first device without waiting for a user's approval.

(7)

The wireless communication device according to any one of (1) to (6),
wherein the controller, when a plurality of the second wireless signals received over a number of times or period exceeding a threshold continuously include the indicator, determines that the first device is specified by the user as a device to be connected with the second wireless interface.

(8)

The wireless communication device according to any one of (1) to (7),
wherein the indicator indicates that the first wireless signal is received by the first device within a most recent predetermined period of time.

(9)

The wireless communication device according to any one of (1) to (8),
wherein the controller allows a third wireless signal for service information inquiry to be sent from the second wireless interface to a device capable of being connected with the second wireless interface, and
wherein the second wireless signal is a response signal to the third wireless signal.

(10)

The wireless communication device according to any one of (1) to (9),
wherein the second wireless interface operates in accordance with a wireless local area network (LAN) mode.

(11)

The wireless communication device according to (10),
wherein the second wireless signal is a service discovery response using Wi-Fi Direct, and wherein the indicator is described in an ANQP query response vendor specific content field of the service discovery response.

(12)

The wireless communication device according to any one of (1) to (11), wherein the controller, after the first wireless signal is sent from the first wireless interface, allows information indicating that the second wireless interface is being processed to be displayed on a screen prior to establishment of the connection by the second wireless interface.

(13)

A communication control device including:

a processor configured to execute a program allowing a second wireless interface to establish a connection with a first device, when a first wireless signal having directivity is sent via a first wireless interface and a second wireless signal received via the second wireless interface includes an indicator indicating that the first wireless signal is received by the first device being a sending source device of the second wireless signal; and a memory configured to store the program.

(14)

A wireless communication device including:

a first wireless interface capable of receiving a first wireless signal having directivity;

a second wireless interface; and a controller configured to allow a second wireless signal to be sent from the second wireless interface to a first device when the first wireless signal is received by the first wireless interface, the second wireless signal including an indicator indicating that the first wireless signal is received, the first device being configured to search for a connection target in a wireless communication mode supported by the second wireless interface.

(15)

The wireless communication device according to (14), further including:

a display unit configured to display an image received through a wireless connection established between the second wireless interface and the first device.

(16)

The wireless communication device according to (14) or (15), wherein the second wireless signal is a response signal to a third wireless signal received by the second wireless interface.

(17)

The wireless communication device according to (16), wherein the controller, when the third wireless signal is received by the second wireless interface, allows the second wireless signal to be sent from the second wireless interface under a condition that a time elapsed from a previous reception of the first wireless signal falls below a threshold.

(18)

The wireless communication device according to (16) or (17), wherein the controller, when identification information of a sending source device of the third wireless signal matches identification information contained in the first wireless signal, allows the second wireless signal to be sent from the second wireless interface as the response signal.

(19)

The wireless communication device according to any one of (14) to (18), wherein the controller, when the first wireless signal is received by the first wireless interface, allows an indication object to be displayed on a screen, the indication object indicating that the wireless communication device is a candidate for the connection target.

(20)

A communication control device including:

a processor configured to execute, when a first wireless signal having directivity is received via a first wireless interface, a program allowing a second wireless signal to be sent to a first device via a second wireless interface, the second wireless signal including an indicator indicating that the first wireless signal is received, the first device being configured to search for a connection target in a wireless communication mode supported by the second wireless interface; and a memory configured to store the program.

(21)

A communication control method executed by a wireless communication device including a first wireless interface and a second wireless interface, the communication control method including:

sending a first wireless signal having directivity from the first wireless interface;

receiving a second wireless signal from the second wireless interface; and allowing the second wireless interface to establish connection with a first device when a second wireless signal includes an indicator indicating that the first wireless signal is received by the first device being a sending source device of the second wireless signal.

(22)

A program causing a computer that controls a wireless communication device including a first wireless interface configured to send a first wireless signal having directivity and a second wireless interface to function as a controller configured to allow the second wireless interface to establish a connection with a first device when a second wireless signal received by the second wireless interface includes an indicator indicating that the first wireless signal is received by the first device being a sending source device of the second wireless signal.

(23)

A communication control method executed by a wireless communication device including a first wireless interface and a second wireless interface, the communication control method including:

receiving a first wireless signal having directivity by the first wireless interface; and sending a second wireless signal from the second wireless interface to a first device, the second wireless signal including an indicator indicating that the first wireless signal is received, the first device being configured to search for a connection target in a wireless communication mode supported by the second wireless interface.

(24)

A program causing a computer that controls a wireless communication device including a first wireless interface capable of receiving a first wireless signal having directivity and a second wireless interface to function as a controller configured to allow a second wireless signal to be sent from the second wireless interface to a first device when the first wireless signal is received by the first wireless interface, the second wireless signal including an indicator indicating that the first wireless signal is received, the first device being configured to search for a connection target in a wireless communication mode supported by the second wireless interface.

REFERENCE SIGNS LIST 100 wireless communication device (request side device)
106 memory
107 first wireless interface (infrared I/F)
108 second wireless interface (wireless LAN I/F)
112 controller (processor)
150 wireless communication device (response side device)
156 memory
157 first wireless interface (infrared I/F)
158 second wireless interface (wireless LAN I/F)
162 controller (processor)

The invention claimed is:

1. A wireless communication device, comprising:
a first wireless interface configured to transmit a first wireless signal having directivity;
a second wireless interface; and
a controller configured to:
transmit a second wireless signal to a plurality of devices, via the second wireless interface, to connect a first device of the plurality of devices with the second wireless interface,
wherein the second wireless signal includes a service information inquiry, and wherein the service information inquiry corresponds to a service supported by the first device of the plurality of devices;
establish a connection, via the second wireless interface, with the first device of the plurality of devices based on a third wireless signal received by the second wireless interface, wherein the third wireless signal includes an indicator indicating that the first wireless signal is received by the first device,
wherein the first device is a sending source device of the third wireless signal, and
wherein the third wireless signal is a response signal to the second wireless signal.

2. The wireless communication device according to claim 1,
wherein the controller is further configured to determine that the first device is specified as a device to be connected with the second wireless interface, based on the third wireless signal that includes the indicator.

3. The wireless communication device according to claim 1, further comprising a display unit configured to display a list of the plurality of devices capable of connection with the second wireless interface.

4. The wireless communication device according to claim 3,
wherein the controller is further configured to control the display unit to display the first device in the list in a highlighted manner.

5. The wireless communication device according to claim 1,
wherein the controller is further configured to establish the connection with the first device via the second wireless interface based on a user approval.

6. The wireless communication device according to claim 1,
wherein the controller is further configured to automatically establish the connection with the first device via the second wireless interface, based on the third wireless signal that includes the indicator.

7. The wireless communication device according to claim 1,
wherein the controller is further configured to determine that the first device is specified as a device to be connected with the second wireless interface, based on the third wireless signal received over one of a threshold number of times or a time period that exceeds a threshold time period.

8. The wireless communication device according to claim 1,
wherein the indicator indicates that the first wireless signal is received by the first device within a specified period of time.

9. The wireless communication device according to claim 1,
wherein the second wireless interface operates based on a wireless local area network (LAN) mode.

10. The wireless communication device according to claim 9,
wherein the third wireless signal is a service discovery response via Wi-Fi Direct, and
wherein an access network query protocol (ANQP) query response vendor specific content field of the service discovery response includes a description of the indicator.

11. The wireless communication device according to claim 1,
wherein the controller is further configured to control a screen to display information indicating a processing status of the second wireless interface prior to establishment of the connection with the first device by the second wireless interface, based on the first wireless signal that is transmitted from the first wireless interface.

12. A communication control device, comprising:
a first wireless interface configured to transmit a first wireless signal having directivity;
a second wireless interface;
a processor configured to:
transmit a second wireless signal to a plurality of devices, via the second wireless interface, to connect a first device of the plurality of devices with the second wireless interface,
wherein the second wireless signal includes a service information inquiry, and wherein the service information inquiry includes a service supported by the first device of the plurality of devices; and
establish a connection, via the second wireless interface, with the first device of the plurality of devices based on a third wireless signal received via the second wireless interface, wherein the third wireless signal includes an indicator indicating that the first wireless signal is received by the first device,
wherein the first device is a sending source device of the third wireless signal, and
wherein the third wireless signal is a response signal to the second wireless signal; and
a memory configured to store the first wireless signal having directivity.

13. A wireless communication device, comprising:
a first wireless interface configured to receive a first wireless signal having directivity;
a second wireless interface; and
a controller configured to:
receive a second wireless signal, that includes a service information inquiry, from a first device,
wherein the service information inquiry corresponds to a service supported by the wireless communication device; and transmit, via the second wireless interface, a third wireless signal to the first device based on the second wireless signal,
wherein the third wireless signal includes an indicator indicating that the first wireless signal is received, and
wherein the first device is configured to search for a connection target in a wireless communication mode supported by the second wireless interface.

14. The wireless communication device according to claim 13, further comprising a display unit configured to display an image received via a wireless connection established between the second wireless interface and the first device.

15. The wireless communication device according to claim 13,
wherein the controller is further configured to transmit the third wireless signal from the second wireless interface based on a time elapsed from a previous reception of the first wireless signal, wherein the time elapsed falls below a threshold time, and
wherein the third wireless signal is transmitted based on the second wireless signal received by the second wireless interface.

16. The wireless communication device according to claim 13,
wherein the controller is further configured to transmit the third wireless signal from the second wireless interface as a response signal, based on second identification information included in the second wireless signal, wherein the second identification information matches first identification information included in the first wireless signal.

17. The wireless communication device according to claim 13,
wherein the controller is further configured to control a screen to display an indication object based on the first wireless signal that is received by the first wireless interface, and
wherein the indication object indicates that the wireless communication device is a candidate for the connection target.

18. A communication control device, comprising:
a first wireless interface configured to receive a first wireless signal having directivity;
a second wireless interface;
a processor configured to:
receive a second wireless signal, that includes a service information inquiry, from a first device,
wherein the service information inquiry corresponds to a service supported by the communication control device; and
transmit, via the second wireless interface, a third wireless signal to the first device based on the first wireless signal having directivity, wherein the first wireless signal is received via the first wireless interface,
wherein the third wireless signal includes an indicator indicating that the first wireless signal is received,
wherein the third wireless signal is a response signal to the second wireless signal, and
wherein the first device is configured to search for a connection target in a wireless communication mode supported by the second wireless interface; and
a memory configured to store the first wireless signal having directivity.

* * * * *